United States Patent
Kawabe et al.

(10) Patent No.: US 8,276,637 B2
(45) Date of Patent: Oct. 2, 2012

(54) APPARATUS AND METHOD FOR MANUFACTURING SHEET

(75) Inventors: Kazumasa Kawabe, Fukui (JP); Kichiro Ishida, Fukui (JP)

(73) Assignees: Fukui Prefecture Government, Fukui-shi (JP); Mitsuya Co., Ltd., Fukui-shi (JP)

(*) Notice: Subject to any disclaimer, the term of this patent is extended or adjusted under 35 U.S.C. 154(b) by 74 days.

(21) Appl. No.: 12/854,649

(22) Filed: Aug. 11, 2010

(65) Prior Publication Data

US 2010/0319857 A1    Dec. 23, 2010

Related U.S. Application Data

(63) Continuation of application No. 11/805,569, filed on May 23, 2007, now Pat. No. 7,828,032.

(30) Foreign Application Priority Data

May 24, 2006  (JP) .................................. 2006-144615
Mar. 12, 2007  (JP) .................................. 2007-62281

(51) Int. Cl.
  *B32B 37/00* (2006.01)
  *B32B 37/02* (2006.01)
  *B32B 38/04* (2006.01)
  *B32B 38/18* (2006.01)

(52) U.S. Cl. ........ 156/517; 156/250; 156/256; 156/263; 156/264; 156/269; 156/510; 156/516; 156/518; 66/84 A; 66/84 R

(58) Field of Classification Search .................. 156/250, 156/256, 263, 264, 269, 510, 516–518; 66/84 A, 66/84 R
See application file for complete search history.

(56) References Cited

U.S. PATENT DOCUMENTS

| 3,250,655 | A | * | 5/1966 | Adler ............................. 156/181 |
| 5,688,577 | A | * | 11/1997 | Smith et al. .................... 428/113 |
| 6,585,842 | B1 | | 7/2003 | Bompard et al. |
| 2006/0188691 | A1 | | 8/2006 | Kawabe et al. |

FOREIGN PATENT DOCUMENTS

| EP | 1 693 496 | 8/2006 |
| JP | 2001-516406 | 9/2001 |
| JP | 2003-221771 | 8/2003 |
| JP | 2006-289619 | 10/2006 |

\* cited by examiner

*Primary Examiner* — Philip Tucker
*Assistant Examiner* — Christopher C Caillouet
(74) *Attorney, Agent, or Firm* — Jordan & Hamburg LLP

(57) ABSTRACT

An end of a sheet drawn out form a feeder is clamped by a pair of upper and lower clamping devices of two or more pairs. The sheet is drawn out from the initial position to the end position in a spread state. While the spread sheet is being tentered on pin tenters, another pair of upper and lower clamping devices at the end position is separated from each other and moved along the respective rails into the initial position. The end of the sheet drawn out from the feeder is clamped from above and below at the initial position with the upper and lower clamping devices that has returned to the initial position.

7 Claims, 30 Drawing Sheets

APPARATUS AND METHOD FOR MANUFACTURING SHEET

CROSS-REFERENCE TO RELATED APPLICATIONS

This application is a continuation application of U.S. application Ser. No. 11/805,569, filed May 23, 2007, now U.S. Pat. No. 7,828,032, and further claims priority from Japanese Patent Application No. 2006-144615, filed on May 24, 2006 and Japanese Patent Application No. 2007-62281, filed on Mar. 12, 2007. The entire contents of these applications are incorporated herein by reference.

TECHNICAL FIELD

The present invention relates to an apparatus and a method for manufacturing a reinforced sheet containing fibers aligned at a predetermined angle, for use in manufacturing a multiaxis multilayer reinforced sheet composed of reinforced fibers such as carbon fibers, glass fibers, or aramid fibers.

BACKGROUND OF THE INVENTION

Since composite materials, particularly, fiber reinforced plastics containing reinforced fibers such as carbon fibers solidified with a resin are light in weight and have made of high strength and high elasticity, they are frequently used for aerospace, sports, and leisure goods. They have also been used more widely for general industries such as automobiles in the recent years, and are expected to become more important materials in the future.

To further increase the use of fiber reinforced plastics in general industrial fields, it is important to reduce the price. Accordingly, it is important to manufacture the fiber reinforced plastics at low cost and at high productivity and therefore it is desired to establish a method for manufacturing them.

A forming method using a multiaxis multilayer reinforced sheet is expected as a low-cost and high-productivity manufacturing method. A method of laminating several sheets in which reinforced fibers are oriented in one direction at a predetermined angle is low in productivity because it takes much time and labor. However, laminating one or several multiaxis multilayer reinforced sheets containing fibers oriented at a predetermined angle in a given thickness can provide high-pseudoisotropy products.

Of course, it is necessary to produce high-quality and high-productivity multiaxis multilayer reinforced sheets. In other words, low-quality and low-productivity multiaxis multilayer reinforced sheets cannot provide low-cost final products. It is therefore important to produce high-quality and high-productivity multiaxis multilayer reinforced sheets.

Various apparatuses and methods for manufacturing multiaxis multilayer reinforced sheets have been proposed. Examples of the apparatuses and methods for manufacturing multiaxis multilayer reinforced sheets with high productivity include an apparatus and a method of inserting wide sheets at a predetermined angle and laminating them: for example, a first method in which a plurality of fiber reinforced sheets are wound in a spiral manner at a predetermined angle (e.g., JP-A-2003-221771) and a second method in which fiber reinforced sheets with different angles are laminated in sequence on a fiber reinforced sheet running on a pin tenter (e.g., JP-T-2001-516406) (the term "JP-T" as used herein means a published Japanese translation of a PCT application).

By the first method disclosed in JP-A-2003-221771, when the sheets are laminated at any angle ($\theta°$), lamination at a symmetric angle ($-\theta°$) occurs without exception and only sheets with the same thickness can be laminated. This makes it difficult to provide multiaxis multilayer reinforced sheets in which desired-thickness sheets are laminated at a desired angle and order.

In the second method, in general, a roll wound with a fiber reinforced sheet is disposed by the side of a pin tenter, from which an end of the fiber reinforced sheet is drawn out and cut in a predetermined width, and mounted to the spikes on the pin tenter.

However, this needs the time to draw the fiber reinforced sheet from the roll, thus taking much time to manufacture.

To solve the above problems, JP-T-2001-516406 discloses a method in which a plurality of holding heads movable along a closed loop path are disposed, an adhesive is applied to ends of the holding heads and the fiber reinforced sheet is bonded to the holding heads with the adhesive whereby the fiber reinforced sheet is drawn out, as shown in FIGS. 12 and 13. This method can reduce the drawing time because of the plurality of holding heads.

However, the holding heads need to be applied with an adhesive to draw one fiber reinforced sheet, and when the adhesive strength of the adhesive is low, the fiber reinforced sheet can come off the holding heads while drawing the fiber reinforced sheet.

BRIEF SUMMARY OF THE INVENTION

Accordingly, in view of the above problems, an object of the invention is to provide an apparatus and a method for manufacturing a sheet in which a sheet can be reliably drawn out from and insert into a roll in a short time and thus be tentered.

According to embodiments of the present invention, there is provided a sheet manufacturing apparatus for manufacturing a reinforced sheet including a sheet-like material and a sheet by tentering the sheet at a predetermined angle over a transfer device that transfers the sheet-like material in a spread state with both rims fixed. The apparatus includes: a feeder disposed on one of the right and left sides of the transfer device, which feeds the sheet; a pair of upper and lower clamping devices configured to clamp an end of the sheet fed from the feeder; a tentering locomotive unit configured to move the upper clamping device and the lower clamping device from the initial position on a first side of the transfer device to the end position at a second side, with the end of the sheet clamped, to tenter the sheet in a spread state; a pair of holders configured to hold both sides of the spread sheet that is clamped by the upper clamping device and the lower clamping device and drawn out to the end position; a cutting device configured to cut the first side of the spread sheet held by the pair of holders; a fixing device configured to move the cut spread sheet held by the pair of holders downward to fix both sides of the spread sheet to both sides of the transfer device; an upper returning device configured to return the upper clamping device from the end position to the initial position; and a lower returning device configured to return the lower clamping device from the end position to the initial position.

According to embodiments of the present invention, there is provided a sheet manufacturing apparatus for manufacturing a reinforced sheet including a sheet-like material and a sheet by tentering the sheet at a predetermined angle over a transfer device that transfers the sheet-like material in a spread state with both rims fixed. The apparatus includes: a first feeder and a second feeder, provided as a pair of right and left feeders disposed on the right and left sides of the transfer device, respectively, and each of which feeds the sheet; a clamping device configured to clamp an end of a first sheet fed from the first feeder; a first tentering locomotive unit configured to move the clamping device from the first feeder to the second feeder, with the end of the first sheet clamped, to tenter the first sheet in a spread state; a first pair of right and left holders configured to hold both sides of the spread first sheet that is clamped by the clamping device and drawn out to the second feeder; a first cutting device configured to cut a first side of the spread first sheet held by the first pair of right and left holders; a first pair of right and left fixing devices configured to move the cut first spread sheet held by the first pair of right and left holders downward to fix both sides of the spread first sheet to both sides of the transfer device; a first preparing device configured to clamp an end of a second sheet fed by the second feeder with the clamping device; a second tentering locomotive unit configured to move the second sheet clamped by the clamping device from the second feeder to the first feeder to tenter the second sheet in a spread state; a second pair of right and left holders configured to hold both sides of the spread second sheet that is clamped by the clamping device and drawn out to the first feeder; a second cutting device configured to cut a second side of the spread second sheet held by the second pair of right and left holders; a second pair of right and left fixing devices configured to move the cut second spread sheet held by the second pair of right and left holders downward to fix both sides of the spread second sheet to both sides of the transfer device; and a second preparing device configured to clamp an end of the first sheet fed by the first feeder with the clamping device.

According to embodiments of the present invention, there is provided an apparatus for manufacturing a multiaxis multilayer reinforced sheet. The apparatus includes: a plurality of the sheet manufacturing apparatuses disposed on the transfer device at predetermined intervals. The sheet manufacturing apparatuses tenter a sheet on the transfer device at a predetermined angle to laminate the sheet on a sheet-like material in sequence.

According to embodiments of the present invention, an end of a sheet is drawn out by a pair of upper and lower clamping devices. This applies even tension over the total width of the sheet, thereby ensuring that the sheet is drawn out with high quality. The upper and lower clamping devices can be returned from the end position to the initial position in a short time without influence by the processes of drawing and tentering the spread sheet, thus reducing the time to manufacture a multiaxis multilayer reinforced sheet and so on.

In other words, immediately after the spread sheet is fixed to both sides of the transfer device, the end of the sheet drawn from the feeder can be drawn out with a clamping device. This reduces the time to manufacture a multiaxis multilayer reinforced sheet and so on.

DETAILED DESCRIPTION OF THE INVENTION

A sheet manufacturing apparatus 10 according to a first embodiment of the invention will be described with reference to the drawings.

First Embodiment

Referring to FIGS. 1 to 14, the sheet manufacturing apparatus 10 according to the first embodiment will be described.

The sheet manufacturing apparatus 10 of this embodiment is to be mounted to a multiaxis-multilayer-reinforced-sheet manufacturing apparatus 100. The multiaxis-multilayer-reinforced-sheet manufacturing apparatus 100 incorporates three sheet manufacturing apparatuses 10.

(1) Structure of Multiaxis-Multilayer-Reinforced-Sheet Manufacturing Apparatus 100

Figure 1:
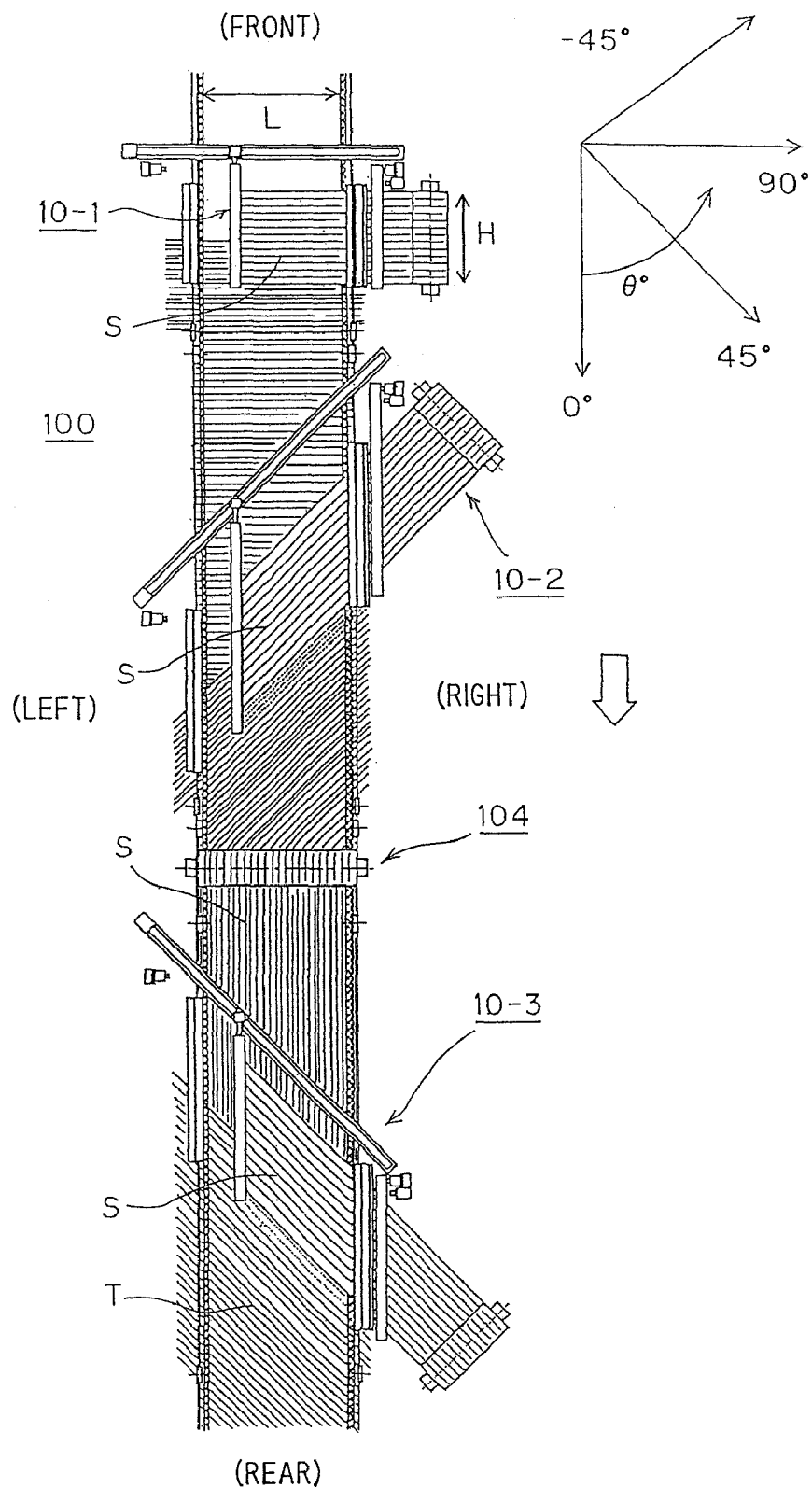
FIG. 1 is a plan view of an apparatus for manufacturing a multiaxis multilayer reinforced sheet according to a first embodiment of the present invention.

Referring first to FIG. 1, the structure of the multiaxis-multilayer-reinforced-sheet manufacturing apparatus 100 will be described.

The multiaxis-multilayer-reinforced-sheet manufacturing apparatus 100 includes a pair of right and left pin tenters 102, the three sheet manufacturing apparatuses 10 described above, and a zero-degree sheet feeder 104.

The pair of right and left pin tenters 102 fixes both rims of a sheet-like material, runs the sheet-like material in one direction at a predetermined speed V, that is, a transfer device for transferring a sheet-like material in a spread state, with the opposite rims fixed. Between the pair of right and left pin tenters 102, a multiaxis multilayer reinforced sheet T, or a sheet-like material, is manufactured. The direction of movement of the pin tenters 102 is hereinafter set at θ=0.

Figure 2:
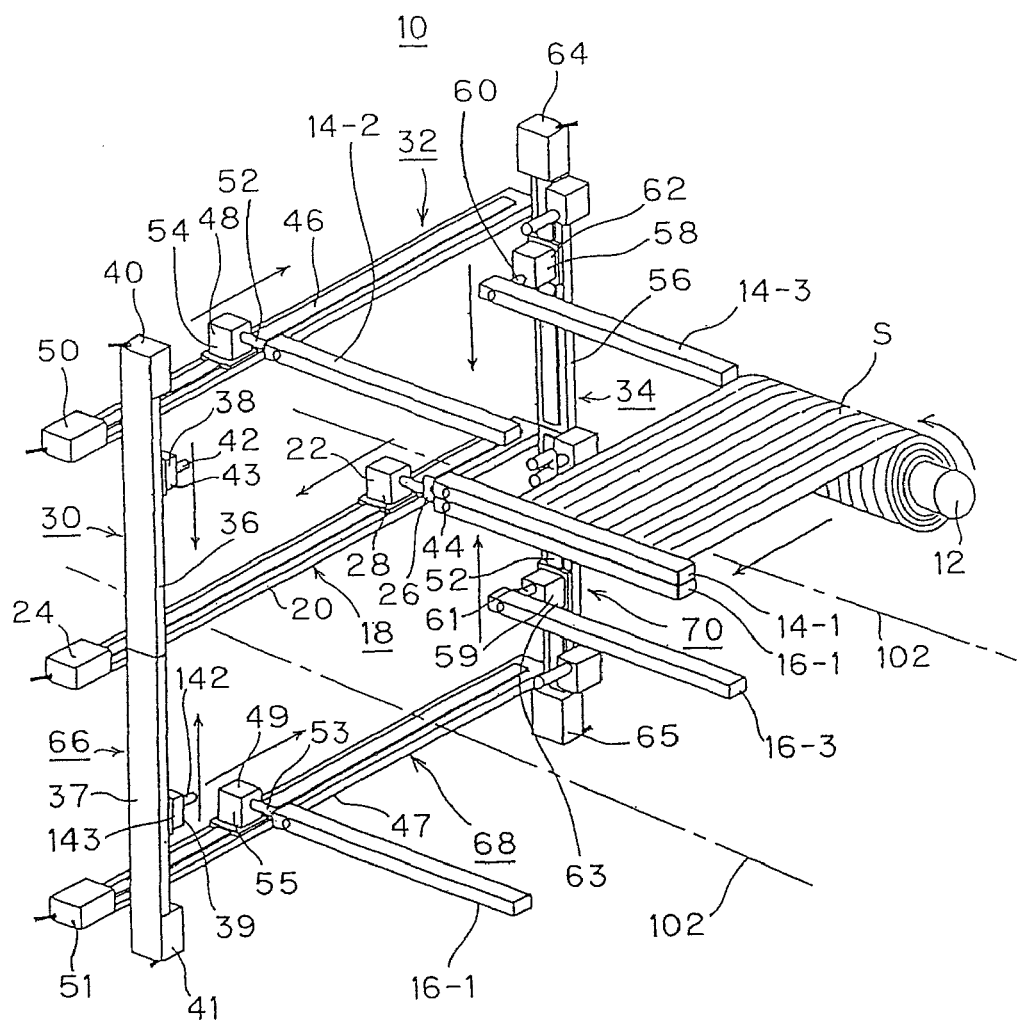
FIG. 2 is a perspective view of a sheet manufacturing apparatus according to the first embodiment.

Referring to FIG. 1, the below is defined as the rear (lower stream), and the above is defined as the front (upper stream). In other words, the pin tenters 102 travels from the rear to the front to transfer the multiaxis multilayer reinforced sheet T in a laterally spread state. When the front of the right and left pin tenters 102 is viewed from the rear, the left of FIG. 1 is defined as the left of the apparatus, and the right of FIG. 1 is defined as the right of the apparatus. Referring to FIG. 2, the lower left is defined as the left of the apparatus, and the upper right is defined as the right of the apparatus. Referring to FIGS. 5 to 12, the left is defined as the left of the apparatus and the right is defined as the right of the apparatus.

A first sheet manufacturing apparatus 10-1 is disposed in the vicinity of the rear of the pin tenters 102. The first sheet manufacturing apparatus 10-1 tenters a fiber reinforced sheet (hereinafter, simply referred to as a sheet) S at an angle of θ=90°.

The sheet S supplied here is a sheet containing aligned fibers, particularly, a fiber reinforced sheet reinforced with fibers, such as carbon fibers, glass fibers, or aramid fibers. Examples of the sheets include a uni-directional reinforced sheet in which more than one bundle fibers are aligned along the width, woven sheets such as a two-axis fabric and a three-axis fabric, and a multiaxis reinforced sheet. In addition to the sheets containing only fibers, a sheet in which fibers are stitched so that the fibers constituting the sheet do not loosen, a sheet filled up with powder resin or welded fibers, and a prepreg sheet containing resin or the like.

A second sheet manufacturing apparatus 10-2 is disposed downstream from the first sheet manufacturing apparatus 10-1 and on the pin tenters 102. The second sheet manufacturing apparatus 10-2 tenters a sheet S on the pin tenters 102 at an angle of θ=−45° to laminate the sheet S on the sheet S that is tentered at an angle of θ=90° on the pin tenters 102.

The zero-degree sheet feeder 104 is disposed downstream from the second sheet manufacturing apparatus 10-2 and on the pin tenters 102. The zero-degree sheet feeder 104 feeds a sheet S at an angle of θ=0° to laminate the sheet S on the sheet S that is laminated at an angle of θ=−45° by the sheet manufacturing apparatus 10-2. The zero-degree sheet feeder 104 winds the sheet S in a roll, and draws the sheet S according to the traveling speed V of the pin tenters 102 to fix the sheet S to spikes 106 on the right and left of the pin tenters 102. The spikes 106 are a set of pins.

The third sheet manufacturing apparatus 10-3 is disposed downstream from the zero-degree sheet feeder 104 and on the pin tenters 102. The third sheet manufacturing apparatus 10-3 laminates a sheet S on the sheet S with an angle of θ=0° at and angle of θ=45°.

The multiaxis-multilayer-reinforced-sheet manufacturing apparatus 100 manufactures four-layer multiaxis multilayer reinforced sheet T in such a manner that the sheet S with an angle of θ=90° is put on the pin tenters 102, on which the sheet S with an angle of θ=−45° is laminated, on which the fiber reinforced sheet with an angle of θ=0° is laminated, and finally the sheet S with an angle of θ=45° is laminated. The four-layer four-axis multiaxis multilayer reinforced sheet T is finally fixed by stitching together along the total width (not shown).

(2) Structure of Sheet Manufacturing Apparatus 10

The structure and operation of the first sheet manufacturing apparatus 10-1 will be described. Since the structures of the second sheet manufacturing apparatus 10-2 and the third sheet manufacturing apparatus 10-3 are the same as that, they will be described as the sheet manufacturing apparatus 10.

The structure of the sheet manufacturing apparatus 10 will be described with reference to FIGS. 1 to 13.

(2-1) Outline of Sheet Manufacturing Apparatus 10

The sheet manufacturing apparatus 10 cuts the sheet S and tenters it to the pin tenters 102 at an inclination of θ°. Let θ be the angle of the pin tenters 102 with respect to the traveling direction, L be the width of the pin tenters 102, and H be the width of the sheet S for the purpose of description.

Referring first to FIG. 2, a winder 12 having a roll around which the sheet S is wound is disposed on the right of the pin tenters 102. The winder 12 serves as a sheet feeder. The winder 12 is located on the right of the pin tenters 102 with an angle of θ° with respect to the pin tenters 102. Specifically, the first sheet manufacturing apparatus 10-1 is disposed so that the sheet S is laminated at an angle of θ=90°; the second sheet manufacturing apparatus 10-2 is disposed so that the sheet S is laminated at an angle of θ=−45°; and the third sheet manufacturing apparatus 10-3 is disposed so that the sheet S is laminated at an angle of θ=45°.

(2-2) Sheet-Inserting Locomotive Robot 18

A rectangular upper clamping device 14 and lower clamping device 16 are disposed to clamp an end of the sheet S drawn from the winder 12 from the above and below. The lengths of the upper clamping device 14 and the lower clamping device 16 are longer than the width H of the sheet S.

A tenter robot 18 for moving the upper and lower clamping devices 14 and 16 from the right to the left is provided. The tenter robot 18 draws out the sheet S at a spread state by a predetermined tension from the right of the pin tenters 102 (hereinafter, referred to as an initial position) to the left of the pin tenters 102 (hereinafter, referred to as an end position), with an end of the sheet S clamped by the upper and lower clamping devices 14 and 16. The winder 12 is rotated under a slight brake (no brake mechanism is shown) so as to apply a predetermined tension to the sheet S when drawing out the sheet S.

As shown in FIG. 2, the tenter robot 18 is disposed only on one side of the upper and lower clamping devices 14 and 16, and above the pin tenters 102 horizontally. The tenter robot 18 is made up of a tenter rail 20 and a tenter mobile unit 22 that moves on the top of the tenter rail 20. The tenter mobile unit 22 is moved linearly by a belt or the like on the tenter rail 20 by a motor 24 disposed in the left end of the tenter rail 20.

Figure 3:
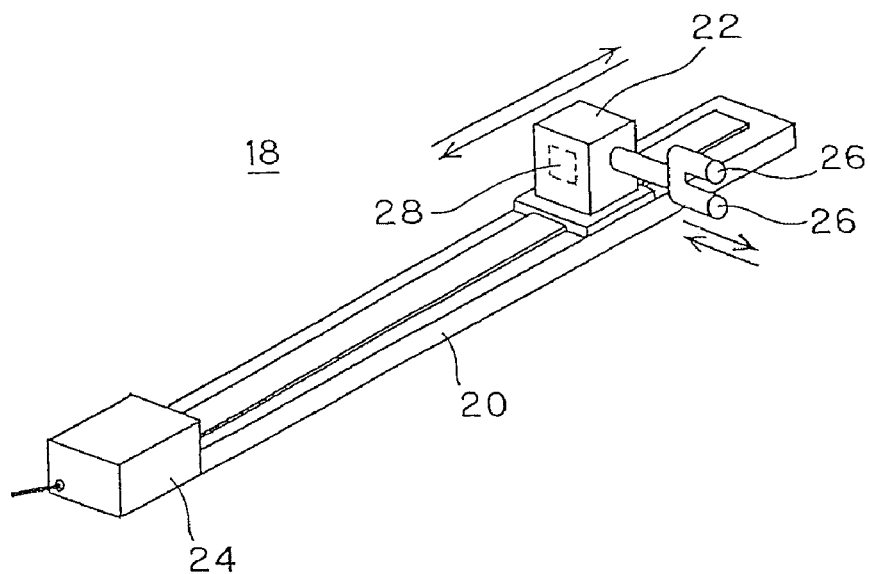
FIG. 3 is a perspective view of a tenter robot.
Figure 13:
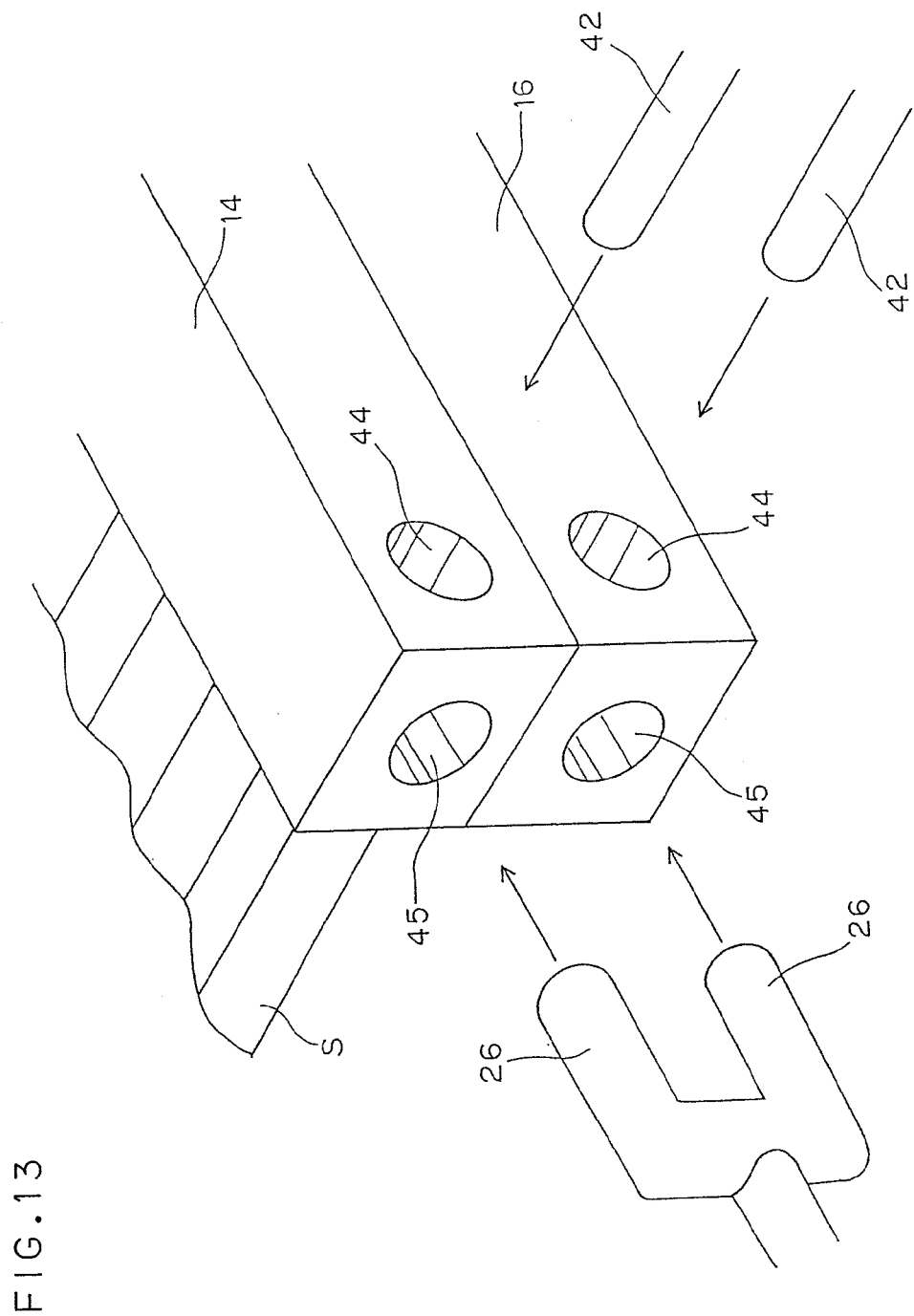
FIG. 13 is a perspective view of an upper clamping device, a lower clamping device, a tentering fixing pin, a first upper fixing pin, and a first lower fixing pin.

Two U-shaped tentering fixing pins 26 for integrally holding the upper and lower clamping devices 14 and 16 project from one side of the tenter mobile unit 22 (see FIGS. 3 and 13). The upper tentering fixing pin 26 is inserted into an insertion hole 45 open in the rear end (the end adjacent to the rear of the apparatus) of the upper clamping device 14, while the lower tentering fixing pin 26 is inserted into an insertion hole 45 open in the rear end of the lower clamping device 16. As the tentering fixing pins 26 are inserted into the upper and lower clamping devices 14 and 16, the upper and lower clamping devices 14 and 16 move with the movement of the tenter mobile unit 22. When moving the upper and lower clamping devices 14 and 16, the tentering fixing pins 26 project from the tenter mobile unit 22, and at other times, the tentering fixing pins 26 stand by in the tenter mobile unit 22. For this reciprocating motion, a pneumatic cylinder or an electromagnet (solenoid) is disposed in the tenter mobile unit 22. The tentering fixing pins 26 reciprocate by the control of a tentering-fixing-pin controller 28 disposed in the tenter mobile unit 22.

(2-3) First to Third Upper Locomotive Robots 30 to 34

The apparatus further includes a structure for returning the upper and lower clamping devices 14 and 16 to the initial position after the sheet S is moved to the end position on the left of the pin tenters 102 by the tenter robot 18. For this returning, in the embodiment, the upper clamping device 14 and the lower clamping device 16 are separately returned. First, a structure for returning the upper clamping device 14 from the end position to the initial position will be described.

A first upper locomotive robot 30 is vertically disposed at the end position of the tenter robot 18. A second upper locomotive robot 32 is dispose in the vicinity of the upper end of the first upper locomotive robot 30. A third upper locomotive robot 34 is vertically disposed at the right end of the second upper locomotive robot 32 (opposite to the first upper locomotive robot 30). The lower end of the third upper locomotive robot 34 is the initial position.

The structure of the first upper locomotive robot 30 is the same as that of the tenter robot 18, which includes a first upper rail 36, a first upper mobile unit 38, and a motor 40 for moving the first upper mobile unit 38 on the first upper rail 36.

Figure 4:
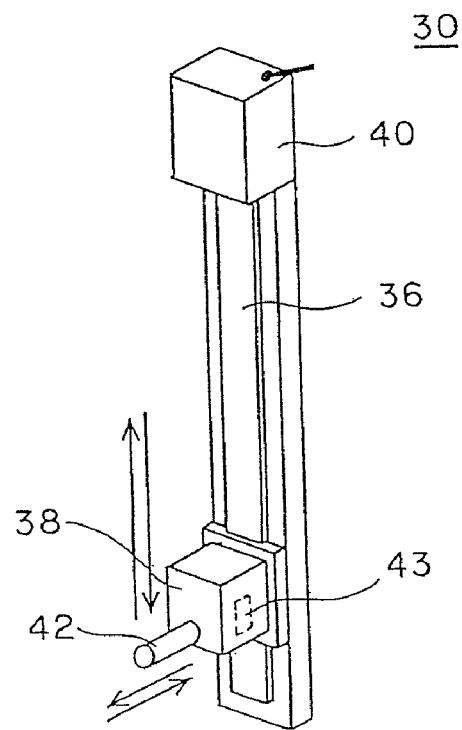
FIG. 4 is a perspective view of a first upper locomotive robot.

The first upper mobile unit 38 moves vertically upward from the end position, from which a first upper fixing pin 42 projects, as shown in FIG. 4. As shown in FIG. 13, the first upper fixing pin 42 is inserted into an insertion hole 44 that is open in the vicinity of the rear end of the left side of the upper clamping device 14 and elevates the upper clamping device 14 with the first upper mobile unit 38. The first upper fixing pin 42 can reciprocate in the first upper mobile unit 38 by a pneumatic cylinder or an electromagnet under the control of a first-upper-fixing-pin controller 43.

The second upper locomotive robot 32 also has the same structure as the first upper locomotive robot 30, and includes a second upper rail 46, a second upper mobile unit 48, and a motor 50. The second upward locomotive robot 32 moves the upper clamping device 14 elevated by the first upper locomotive robot 30 from the left of the pin tenters 102 to the right in the horizontal direction. In this case, the second upper mobile unit 48 has a second upper fixing pin 52. The second upper fixing pin 52 is inserted into an insertion hole 45 of the upper clamping device 14 by a second-upper-fixing-pin controller 54 to move the upper clamping device 14.

The third upper locomotive robot 34 also has the same structure as the first upper locomotive robot 30, and includes a third upper rail 56, a third upper mobile unit 58, a third upper fixing pin 60, a third-upper-fixing-pin controller 62, and a motor 64.

The upper clamping device 14 is returned from the end position to the initial position by the first upper locomotive robot 30, the second upper locomotive robot 32, and the third upper locomotive robot 34. For the first upper locomotive robot 30, the second upper locomotive robot 32, and the third upper locomotive robot 34, there are a plurality of upper clamping devices 14 for waiting. In this embodiment, there are three upper clamping devices 14 including the upper clamping device 14 that is tentering the sheet S.

(2-4) First to Third Lower Locomotive Robots 66 to 70

The apparatus further includes a first lower locomotive robot 66, a second lower locomotive robot 68, and a third lower locomotive robot 70 for moving the lower clamping device 16 from the end position to the initial position. The first lower locomotive robot 66 moves the lower clamping device 16 from the end position downward in the vertical direction. The second lower locomotive robot 68 moves the lower clamping device 16 from the left to the right below the pin tenters 102. The third lower locomotive robot 70 elevates the lower clamping device 16 to the initial position from below the right of the pin tenters 102 (the side of the initial position).

The first lower locomotive robot 66, the second lower locomotive robot 68, and the third lower locomotive robot 70 also have the same structures as the first upper locomotive robot 30, the second upper locomotive robot 32, and the third upper locomotive robot 34. Specifically, the first lower locomotive robot 66 has a first lower rail 37, a first lower mobile unit 39, a motor 41, a first lower fixing pin 142, and a first-lower-fixing-pin controller 143; the second lower locomotive robot 68 has a second lower rail 47, a second lower mobile unit 49, a motor 51, a second lower fixing pin 53, and a second-lower-fixing-pin controller 55; the third lower locomotive robot 70 has a third lower rail 57, a third lower mobile unit 59, a third lower fixing pin 61; a third-lower-fixing-pin controller 63, and a motor 65. The first to third lower locomotive robots 66 to 70 move the lower clamping device 16 by inserting the respective fixing pins 142, 53, and 61 into the insertion hole 45 at the rear end of the lower clamping device 16 and the insertion holes 44 at the end of the right and left sides of the lower clamping device 16.

(2-5) Holders 74

A pair of right and left holders 74 for holding the sheet S is disposed inside the initial position and the end position of the upper and lower clamping devices 14 and 16.

As shown in FIGS. 5 to 12, the holders 74 temporarily hold the sheet S tentered on the pin tenters 102 by the upper and lower clamping devices 14 and 16, and have a pair of upper holder 76 and lower holder 78 on both sides of the pin tenters 102. The upper holder 76 is moved downward and the lower holder 78 is moved upward by pneumatic cylinders to retain the rims of the sheet S. The holders 74 have the mechanism of moving according to the traveling speed V of the pin tenters 102.

(2-6) Cutting Device 80

A cutting device 80 is disposed between the holder 74 and the winder 12. This is for cutting the sheet S between the holder 74 and the winder 12 with a cutter 82. The cutter 82 is moved downward by a pneumatic cylinder for cutting. Thus the sheet S is cut off from the roll.

(2-7) Pressing Unit 84

A pair of right and left pressing units 84 is disposed inside the right and left holders 74, respectively. The pressing units 84 press downward the sheet S which is cut by the cutting device 80 while the sheet S is held by the holders 74 to stick the sheet S into the spikes 106 on the right and left side of the pin tenters 102 for fixing.

When double-faced adhesive tape is attached on the pin tenters 102 in advance, the sheet S can be fixed to the spikes 106 more securely.

(3) Electrical Structure of Multiaxis-Multilayer-Reinforced-Sheet Manufacturing Apparatus 100

Figure 14:
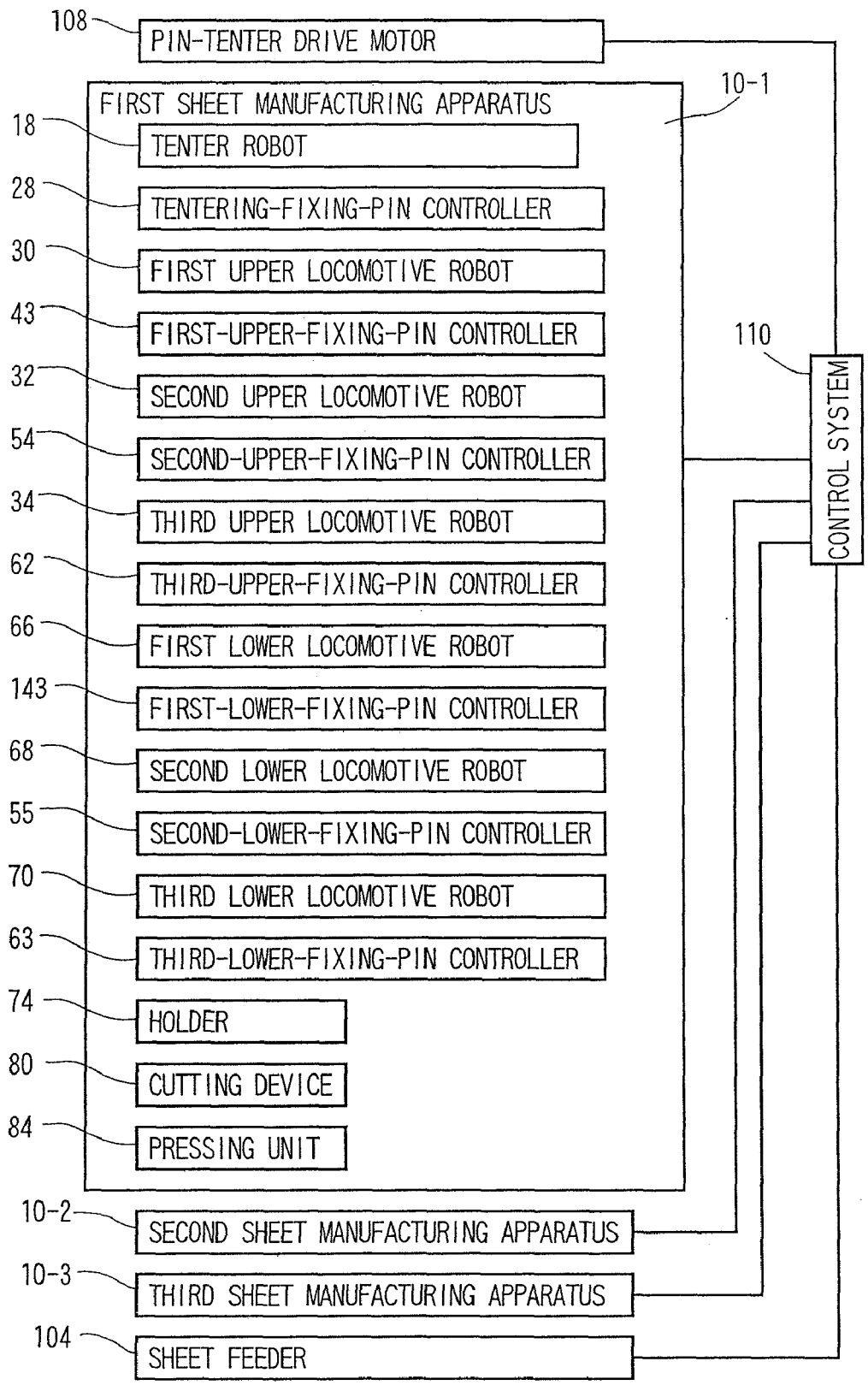
FIG. 14 is a block diagram of the apparatus for manufacturing a multiaxis multilayer reinforced sheet.

The electrical structure of the multiaxis-multilayer-reinforced-sheet manufacturing apparatus 100 will be described with reference to the block diagram of FIG. 14.

A computer control system 110 is provided to control the multiaxis-multilayer-reinforced-sheet manufacturing apparatus 100. The control system 110 connects to a pin-tenter drive motor 108 for driving the pin tenters 102 at the traveling speed V, and also connects to the first sheet manufacturing apparatus 10-1, the second sheet manufacturing apparatus 10-2, the third sheet manufacturing apparatus 10-3, and the zero-degree sheet feeder 104. The following processing steps can be achieved by a program stored in the control system 110.

(4) Manufacturing Process of Sheet Manufacturing Apparatus 10

The manufacturing process of the sheet manufacturing apparatus 10 will be described in sequence.

(4-1) First Process

Figure 5:
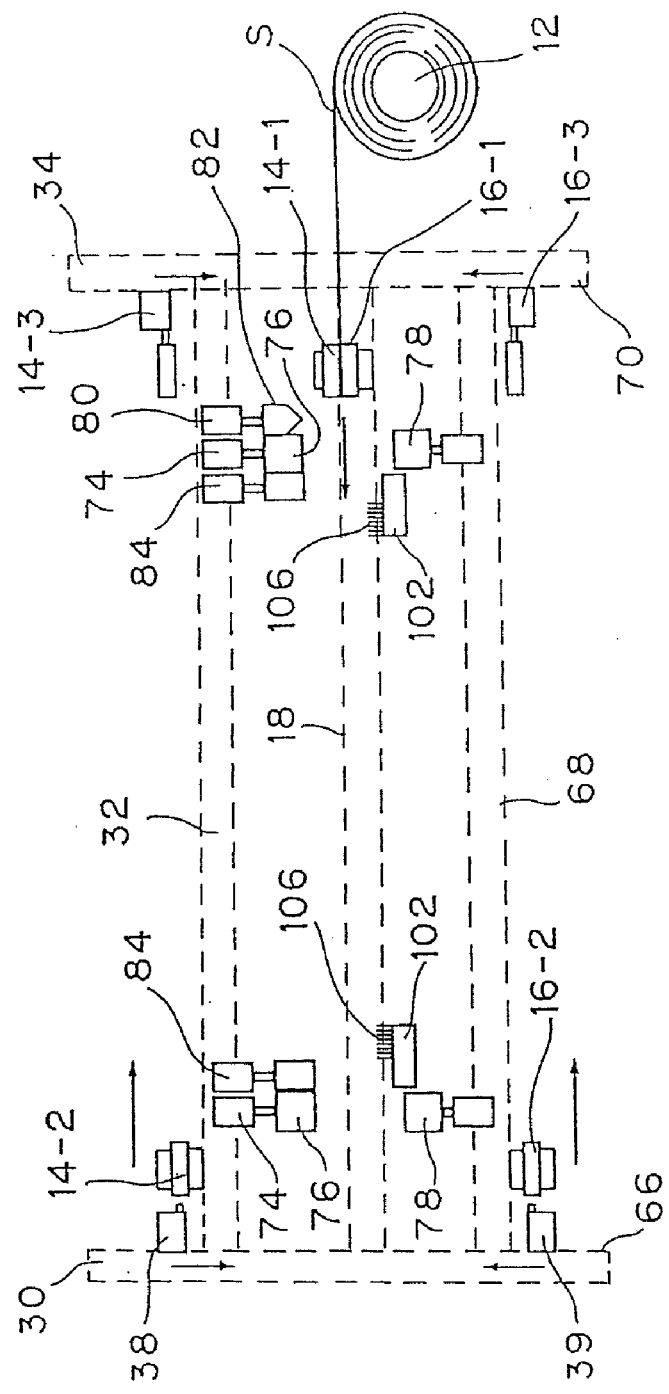
FIG. 5 is a diagram of describing a first process according to the first embodiment.

Referring to FIG. 5, the first process will be described.

In the first process, an end of the sheet S that is partly drawn out from the winder 12 is clamped by the first set of upper and lower clamping devices 14-1 and 16-1 and fixed on the right side of the pin tenters 102. The fixed position is the above-described initial position. In this case, the upper clamping device 14-1 and the lower clamping device 16-1 are fixed together by the tentering fixing pins 26 of the tenter robot 18.

A second set of upper clamping device 14-2 and lower clamping device 16-2 are located at the starting points of the second upper locomotive robot 32 and the second lower locomotive robot 68, respectively.

A third set of upper clamping device 14-3 and lower clamping device 16-3 are located at the end positions of the second upper locomotive robot 32 and the second lower locomotive robot 68, respectively.

The relationship among the three sets of upper clamping device 14 and lower clamping device 16 of the sheet manufacturing apparatus 10 will be described. While the first set of upper and lower clamping devices 14-1 and 16-1 is tentering the sheet S, the second set of upper and lower clamping devices 14-2 and 16-2 move along the second upper locomotive robot 32 and the second lower locomotive robot 68, respectively, and the third set of upper and lower clamping devices 14-3 and 16-3 move along the third upper locomotive robot 34 and the third lower locomotive robot 70, respectively.

(4-2) Second Process

Figure 6:
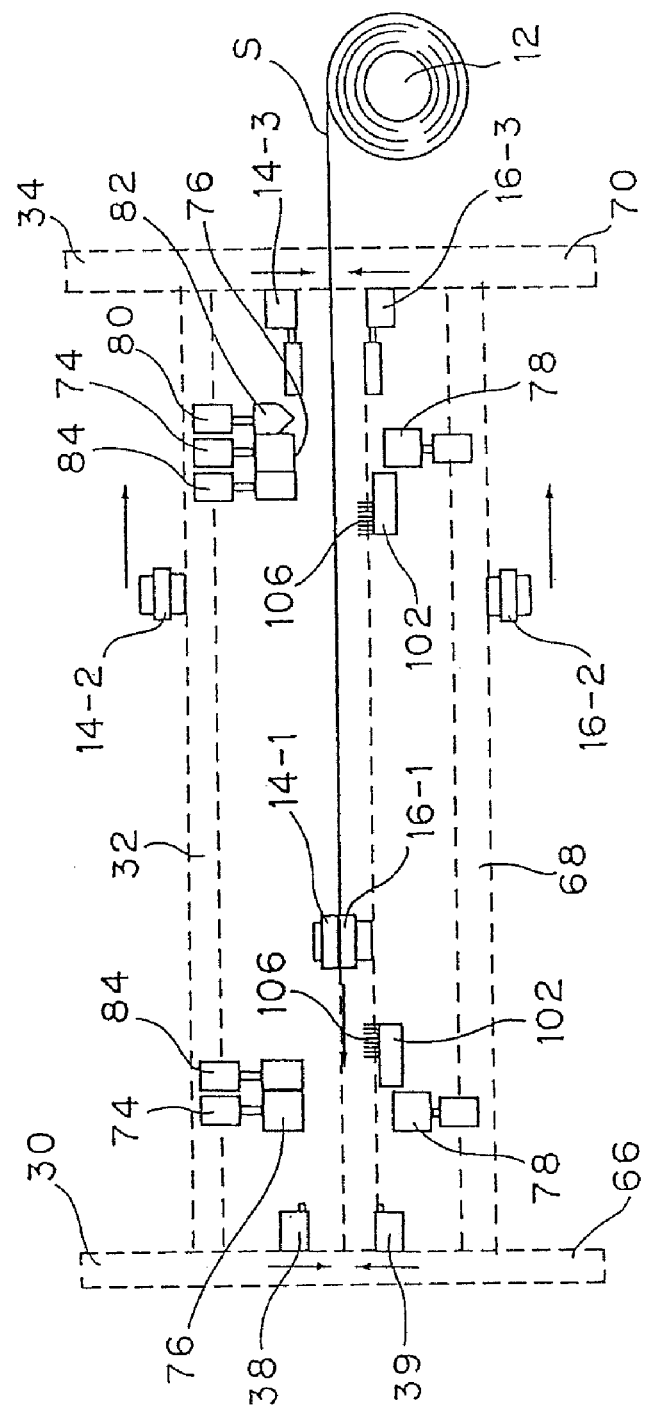
FIG. 6 is a diagram of describing a second process according to the first embodiment.

Referring to FIG. 6, the second process will be described.

In the second process, the tenter mobile unit 22 starts to move from the initial position of the tenter rail 20 while the upper clamping device 14-1 and the lower clamping device 16-1 clamp the end of the sheet S. Since the winder 12 is rotating under a brake, the sheet S is stretched tightly on the pin tenters 102 under tension.

The upper clamping device 14-2 of the second set is moved from the starting point to the end position by the second upper mobile unit 48 of the second upper locomotive robot 32. The lower clamping device 16-2 of the second set is moved from the starting point to the end position by the second lower mobile unit 49 of the second lower locomotive robot 68.

The upper clamping device 14-3 of the third set is moved from the starting point to the end position by the third upper mobile unit 58 of the third upper locomotive robot 34. The lower clamping device 16-3 of the third set is moved from the starting point to the end position by the third lower mobile unit 59 of the third lower locomotive robot 70.

The first upper mobile unit 38 of the first upper locomotive robot 30 and the first lower mobile unit 39 of the first lower locomotive robot 66 move to the end position of the tenter robot 18 while holding no sheet S.

(4-3) Third Process

Figure 7:
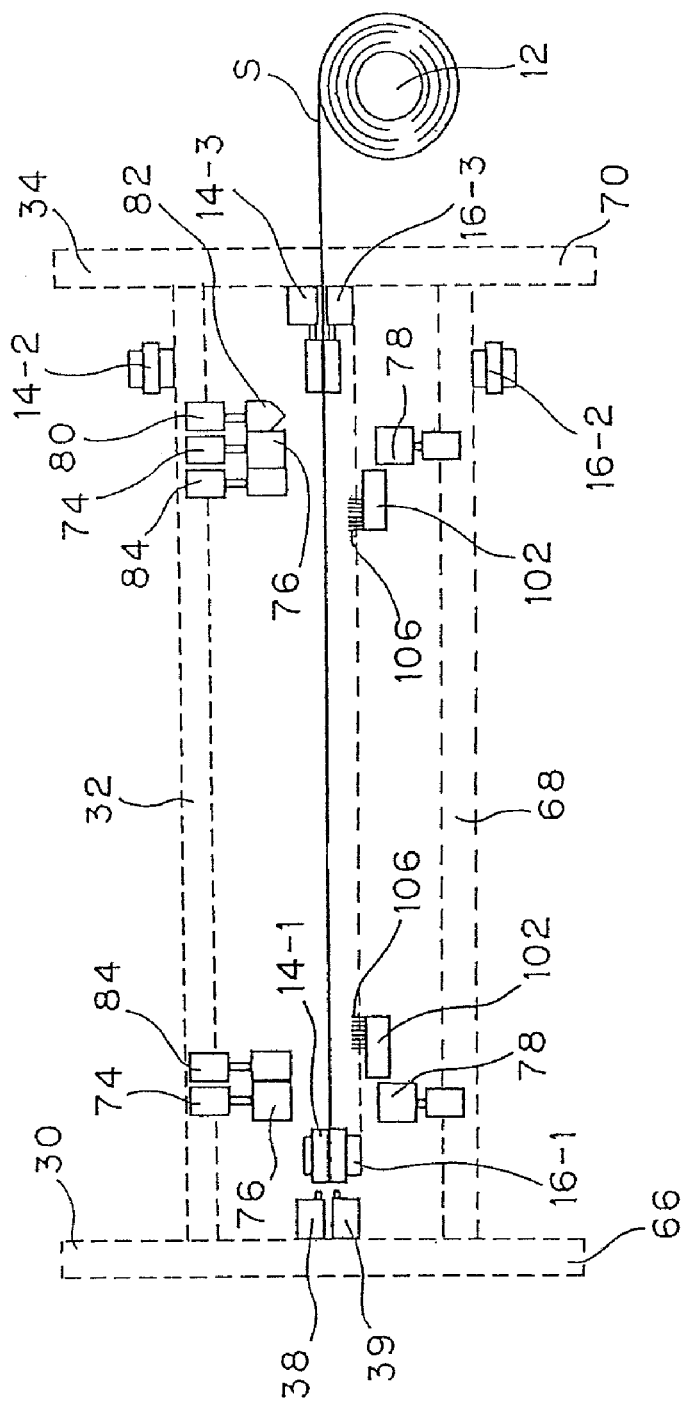
FIG. 7 is a diagram of describing a third process according to the first embodiment.

Referring to FIG. 7, the third process will be described.

In the third process, the first set of upper and lower clamping devices 14-1 and 16-1 moves along the width of the pin tenters 102 to reach the end position. At that time, the first upper fixing pin 42 of the first upper mobile unit 38 is inserted into the insertion hole 45 of the upper clamping device 14-1, and the first lower fixing pin 142 of the first lower mobile unit 39 is inserted into the insertion hole 44 of the lower clamping device 16-1, thereby fixing the upper clamping device 14-1 and the lower clamping device 16-1 together. The tentering fixing pins 26 are removed from the insertion holes 45 of the upper clamping device 14-1 and the lower clamping device 16-1 by the control of the tentering-fixing-pin controller 28. The sheet S is tentered above the pin tenters 102 in that state.

The upper clamping device 14-2 of the second set reaches the end position by the second upper mobile unit 48 of the second upper locomotive robot 32. The lower clamping device 16-2 of the second set reaches the end position by the second lower mobile unit 49 of the second lower locomotive robot 68.

The upper clamping device 14-3 of the third set reaches the end position from the starting point by the third upper mobile unit 58 of the third upper locomotive robot 34. The lower clamping device 16-3 of the third set reaches the end position from the starting point by the third lower mobile unit 59 of the third lower locomotive robot 70. At the arriving, the upper clamping device 14-3 and the lower clamping device 16-3 of the third set clamp the right side of the sheet S to fix them.

(4-4) Fourth Process

Figure 8:
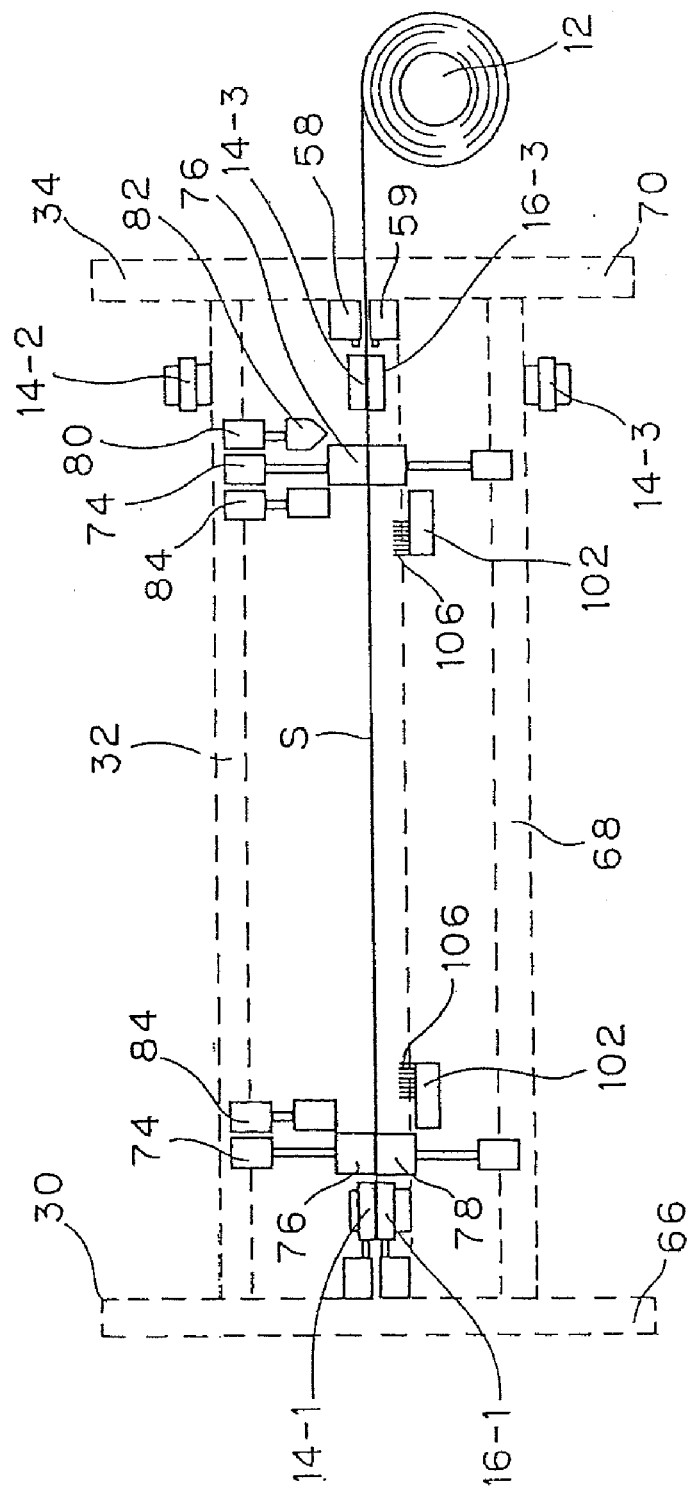
FIG. 8 is a diagram of describing a fourth process according to the first embodiment.

Referring to FIG. 8, the fourth process will be described.

In the fourth process, the upper holder 76 and the lower holder 78 of the pair of right and left holders 74 move vertically to temporarily hold the sheet S that is tentered by the first set of upper and lower clamping devices 14-1 and 16-1. At that time, the pair of right and left holders 74 is at rest with respect to the traveling speed V of the pin tenters 102.

(4-5) Fifth Process

Figure 9:
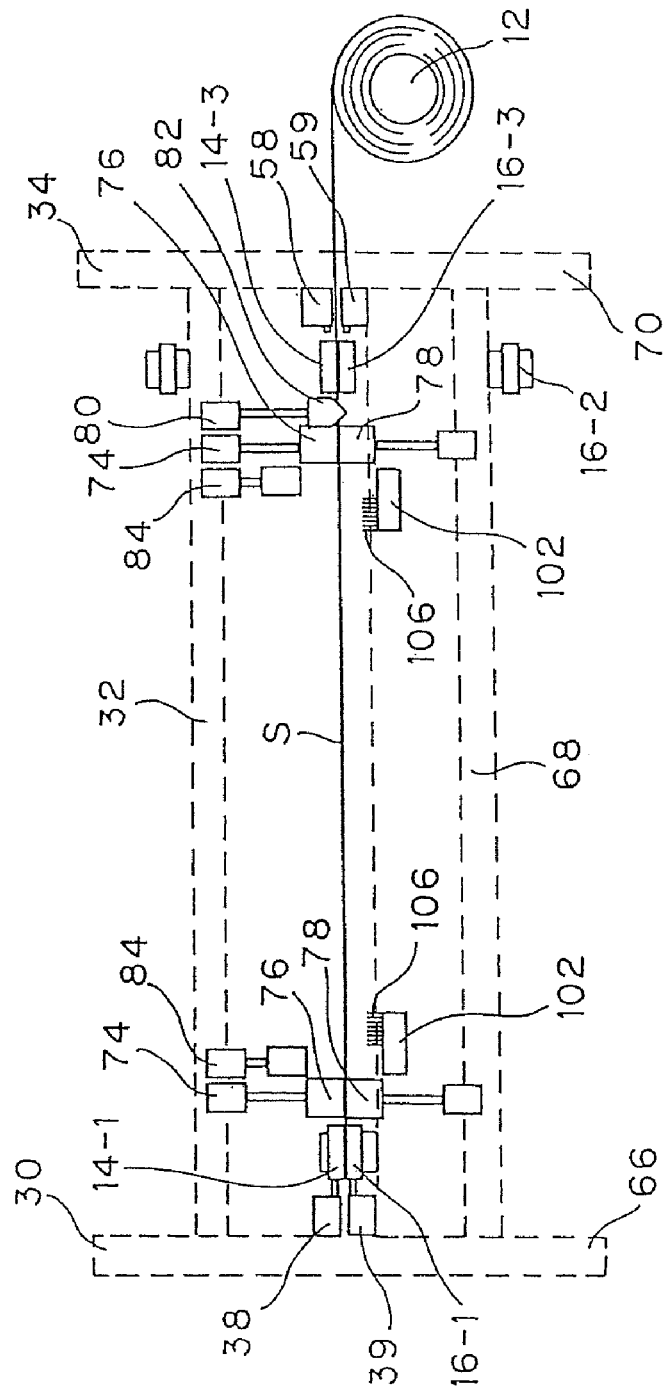
FIG. 9 is a diagram of describing a fifth process according to the first embodiment.

Referring to FIG. 9, the fifth process will be described.

In the fifth process, the side of the sheet S, at the initial position, held temporarily by the pair of right and left holders 74 is cut by the cutter 82 of the cutting device 80. The cut sheet S is fixed by the first set of upper and lower clamping devices 14-1 and 16-1 and by the pair of right and left holders 74.

The end of the sheet S drawn out from the winder 12 is fixed by the third set of upper and lower clamping device 14-3 and 16-3.

(4-6) Sixth Process

Figure 10:
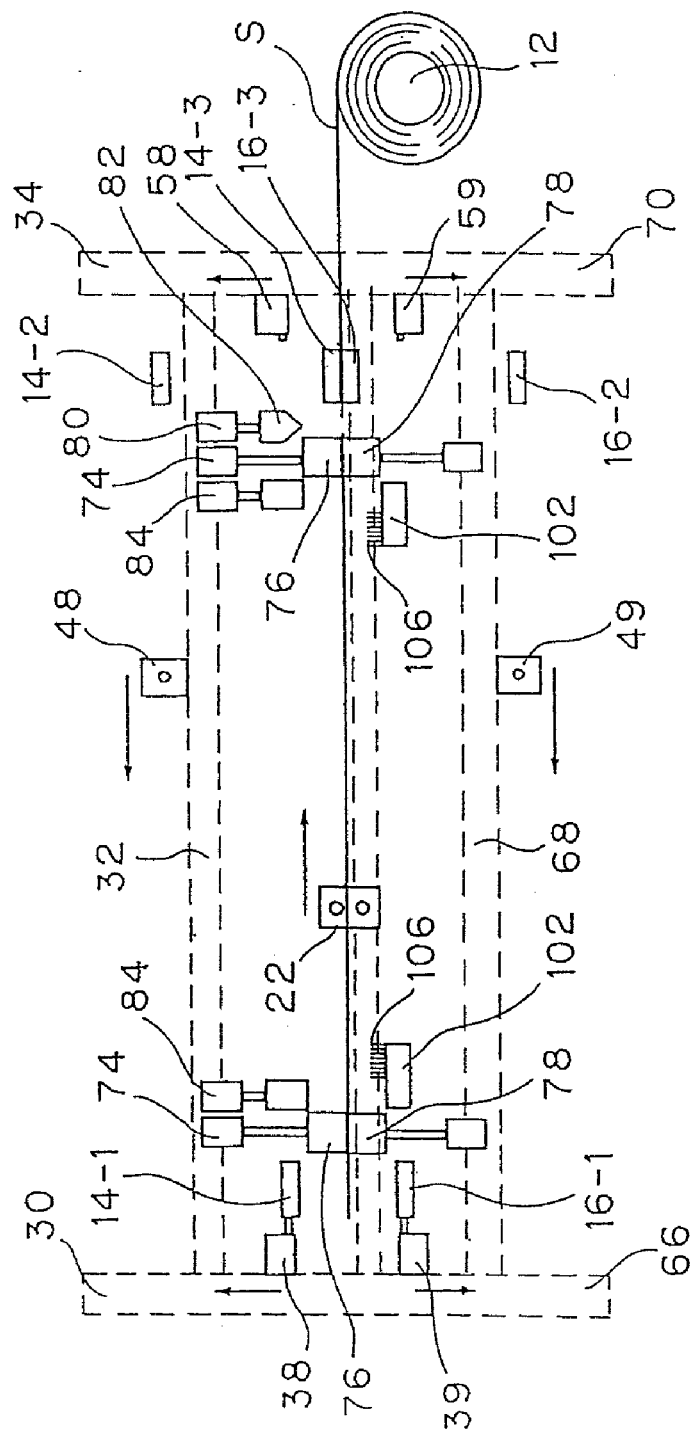
FIG. 10 is a diagram of describing a sixth process according to the first embodiment.

Referring to FIG. 10, the sixth process will be described.

In the sixth process, the upper clamping device 14-1 of the first set is moved upward along the first upper rail 36 by the first upper mobile unit 38, and the lower clamping device 16-1 is moved downward along the first lower rail 37 by the first lower mobile unit 39. This releases the sheet S held by the first set of upper and lower clamping devices 14-1 and 16-1.

The tenter mobile unit 22 at the end position returns to the initial position at a high speed along the tenter rail 20.

The second upper mobile unit 48 of the second upper locomotive robot 32 and the second lower mobile unit 49 of the second lower locomotive robot 68 also start to move toward the starting point. The upper and lower clamping devices 14-2 and 16-2 of the second set are left at the end position. Therefore, temporary fixing pins (not shown) in the vicinity of the right ends of the second upper rail 46 and the lower rail 47 are inserted into the insertion holes of the upper clamping device 14-2 and the lower clamping device 16-2, respectively, to fix them temporarily.

The third upper mobile unit 58 of the third upper locomotive robot 34 and the third lower mobile unit 59 of the third lower locomotive robot 70 also start to move toward the starting point. The third set of upper and lower clamping devices 14-3 and 16-3 are fixed together, with the sheet S in between. Therefore, temporary fixing pins (not shown) at the ends of the third upper rail 56 and the third lower rail 57 are inserted into the insertion holes of the upper clamping device 14-3 and the lower clamping device 16-3, respectively, to fix them temporarily.

(4-7) Seventh Process

Figure 11:
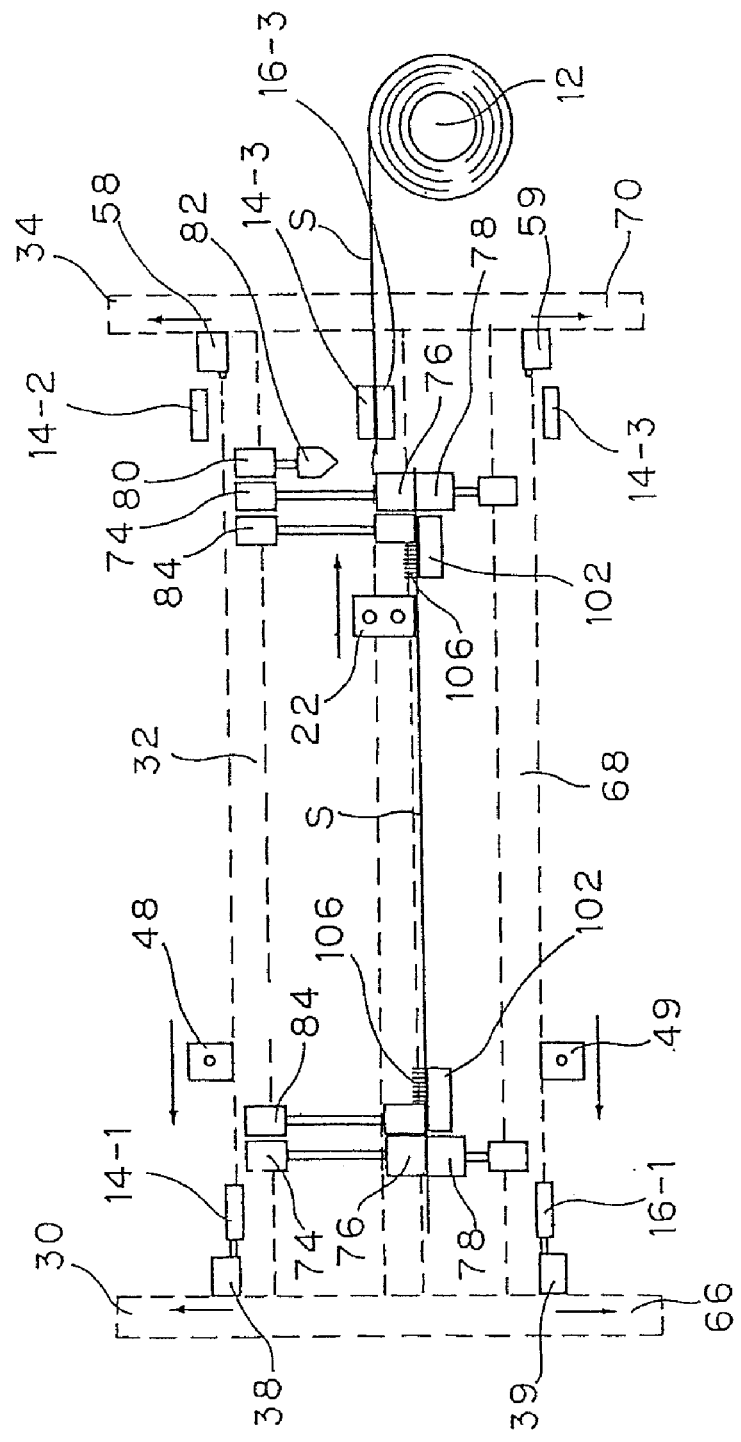
FIG. 11 is a diagram of describing a seventh process according to the first embodiment.

Referring to FIG. 11, the seventh process will be described.

In the seventh process, the sheet S that is temporarily held by the pair of right and left holders 74 is pushed downward with the pair of right and left pressing units 84 to fix the rims of the sheet S to the spikes 106 on the right and left of the pin tenters 102. In this case, double-faced adhesive tape may be provided between the rims and the spikes 106 to reinforce the fixation. The pair of right and left holders 74 and pressing units 84 have the mechanism to move the sheet S according to the traveling speed V of the pin tenters 102 to fix them at a relative speed of zero when pushing the sheet S against the pin tenters 102.

(4-8) Eighth Process

Figure 12:
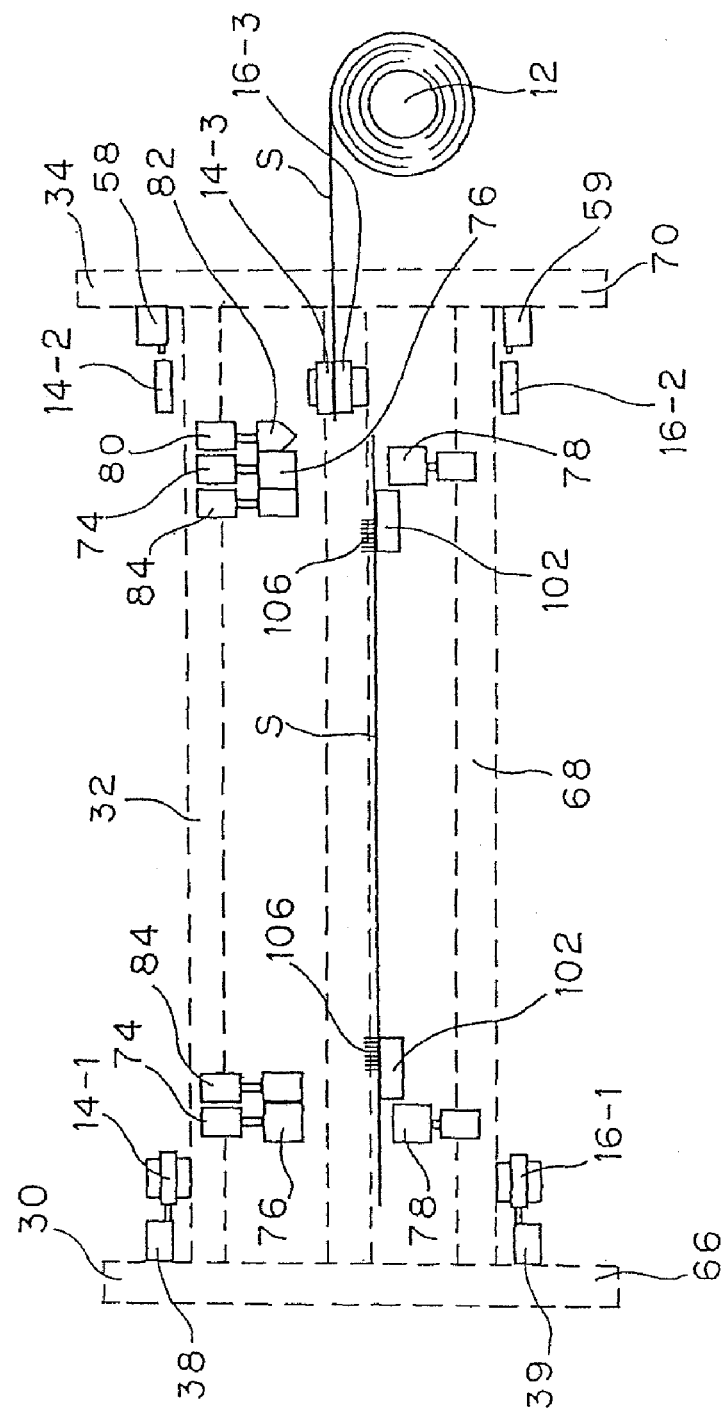
FIG. 12 is a diagram of describing an eighth process according to the first embodiment.

Referring to FIG. 12, the eighth process will be described.

In the eighth process, the pressing units 84 return upward, and the pair of right and left holders 74 also returns to the initial position.

The sheet S fixed to the pin tenters 102 moves at the traveling speed V.

The first to eighth processes are repeated in sequence to tenter the sheet S on the pin tenters 102.

Since the sheet S can be drawn out by the third set of upper and lower clamping devices 14-3 and 16-3, with the sheet S pressed by the pressing units 84, the sheet S can be tentered in the following first process without the need for waiting time to mount a tool for drawing out the sheet S from the roll and inserting it onto the pin tenters.

(5) Relationship Between Traveling Speed V of Pin Tenters 102 and Cycle Time of Sheet Manufacturing Apparatus 10

The multiaxis-multilayer-reinforced-sheet manufacturing apparatus 100 includes three sheet manufacturing apparatuses 10. The first sheet manufacturing apparatus 10-1 tenters the sheet S at $\theta=0°$. The second sheet manufacturing apparatus 10-2 tenters the sheet S at $\theta=-45°$. The third sheet manufacturing apparatus 10-3 tenters the sheet S at $\theta=45°$.

Therefore, the first sheet manufacturing apparatus 10-1 tenters the sheet S with a width H by repeating the first to eighth processes during the time the pin tenters 102 moves at the traveling speed V by the distance corresponding to the width H of the sheet S.

The second sheet manufacturing apparatus 10-2 executes the first to eighth processes while the pin tenters 102 are moving through H/sin 45°.

Also the third sheet manufacturing apparatus 10-3 executes the first to eighth processes while the pin tenters 102 are moving through H/sin −45°. Thus, the sheet S can be continually tentered without clearance by the sheet manufacturing apparatuses 10-1 to 10-3.

(6) Advantages

With the sheet manufacturing apparatus 10 of this embodiment, the three sets of upper and lower clamping devices 14 and 16 move in sequence and, while one set of upper and lower clamping devices 14 and 16 is tentering the sheet S, another set of upper and lower clamping devices 14 and 16 returns to the initial position. Therefore, the sheet S can be continuously tentered on the pin tenters 102 without waiting time.

Since the sheet S is moved, with the end held by the pair of upper and lower clamping devices 14 and 16, the sheet S can be tentered without coming off in the middle under an even tension across the total width and with high quality. Since the lengths of upper and lower clamping devices 14 and 16 can be set in correspondence with the sheet width, a wide sheet can also be drawn out.

The upper and lower clamping devices 14 and 16 can be returned from the end position to the initial position irrespective of the process of drawing out the sheet S and the process of tentering the drawn sheet S on the pin tenters 102. Accordingly, controlling the upper and lower clamping devices 14 and 16, which are returned to the initial position, so as to clamp the end of the sheet S drawn out from the feeder from above and below at the initial position while the sheet S is drawn out from the feeder and the drawn sheet is tentered on the pin tenters 102 allows the drawing of the sheet S in the next cycle directly after the sheet S is tentered on the pin tenters 102. Thus, the process of drawing the sheet S and the process of tentering the drawn sheet S on the pin tenters 102 can be repeated in a short time.

Second Embodiment

Figure 15:
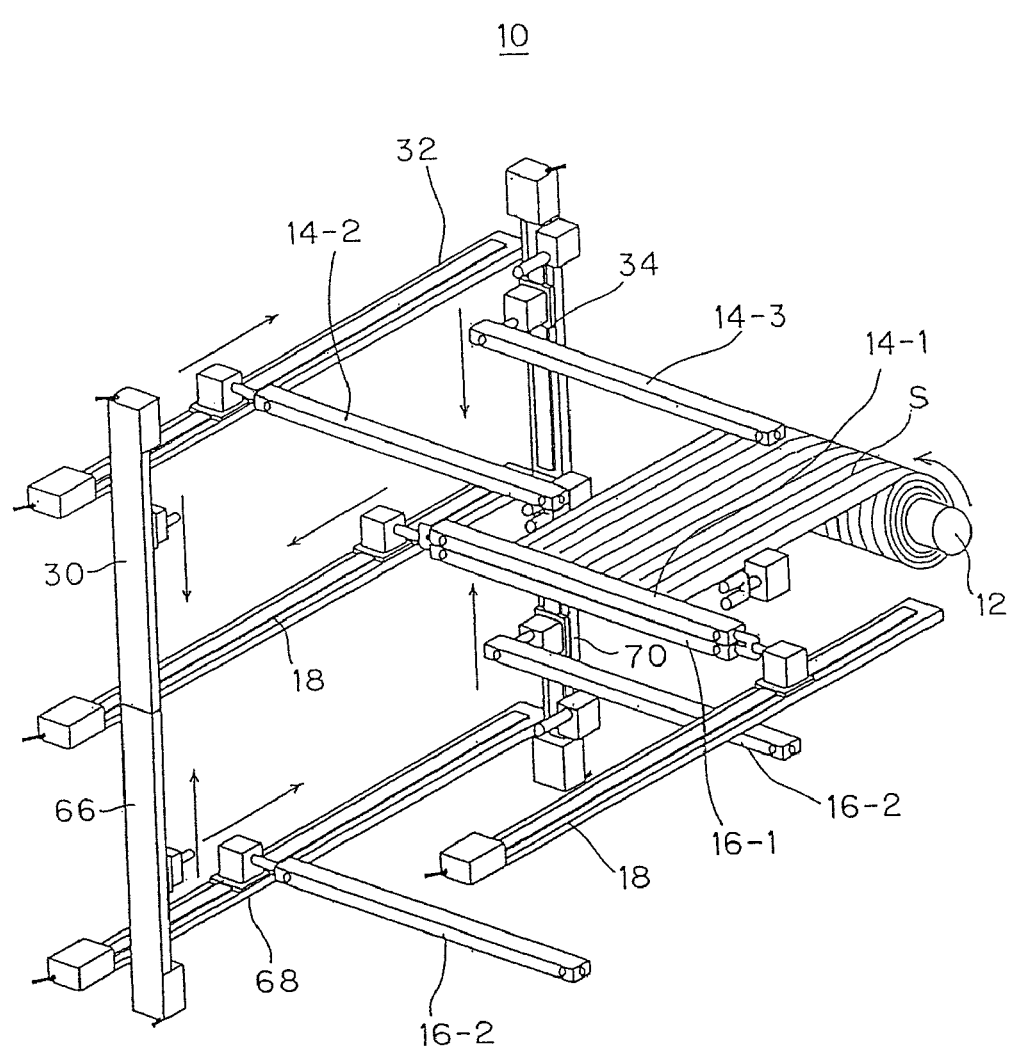
FIG. 15 is a perspective view of a sheet manufacturing apparatus according to a second embodiment of the invention.

A sheet manufacturing apparatus 10 according to a second embodiment of the invention will be described with reference to FIG. 15.

The sheet manufacturing apparatus 10 of the second embodiment is different from the sheet manufacturing apparatus 10 of the first embodiment in that the tenter robot 18 for fixing the pair of upper and lower clamping devices 14 and 16 is disposed at both ends of the sheet S. Specifically, with the sheet manufacturing apparatus 10 of the first embodiment, the pair of upper and lower clamping devices 14 and 16 is moved with one side of the sheet S held by the tenter robot 18. However, in this embodiment, an additional tenter robot 18 is disposed on the other side of the sheet S to support the pair of upper and lower clamping devices 14 and 16 on both sides of the sheet S. This structure ensures that a wide sheet S is held and tentered with the total width under a predetermined tension.

The first upper locomotive robot 30, the second upper locomotive robot 32, the third upper locomotive robot 34, the first lower locomotive robot 66, the second lower locomotive robot 68, and the third lower locomotive robot 70 may not cantilever and may support both ends of the upper and lower clamping devices 14 and 16.

Third Embodiment

A sheet manufacturing apparatus 10 according to a third embodiment of the invention will be described with reference to FIG. 16.

The difference between the embodiment and the first embodiment is the structure of the rails along which the upper and lower clamping devices 14 and 16 are moved. In the first embodiment, the upper and lower clamping devices 14 and 16 are moved from the initial position to the end position and from the end position to the initial position using four rails.

Figure 16:
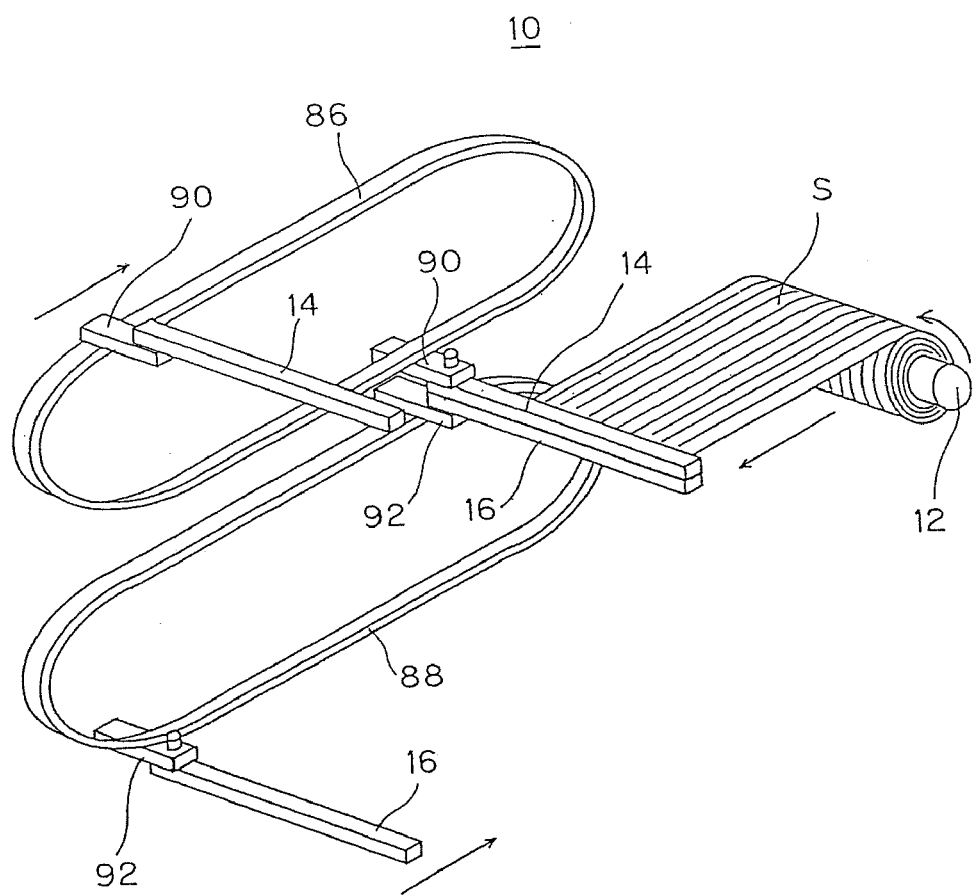
FIG. 16 is a perspective view of a sheet manufacturing apparatus according to a third embodiment of the invention.
Figure 17:
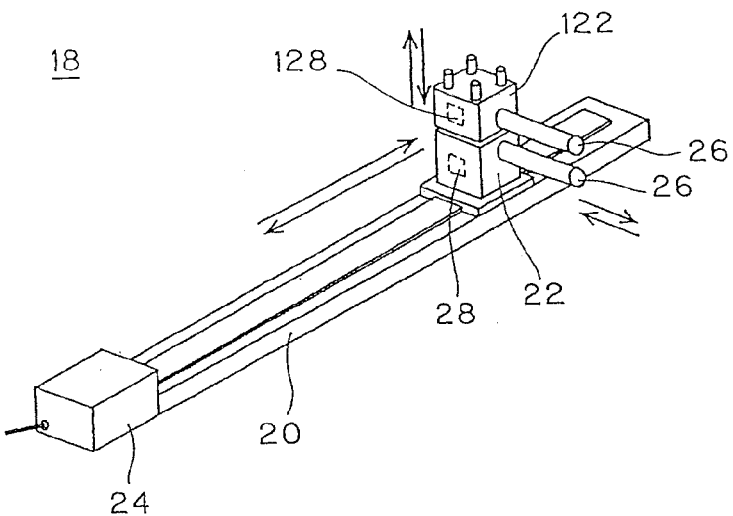
FIG. 17 is a perspective view of a tenter robot according to a fourth embodiment of the invention.
Figure 18:
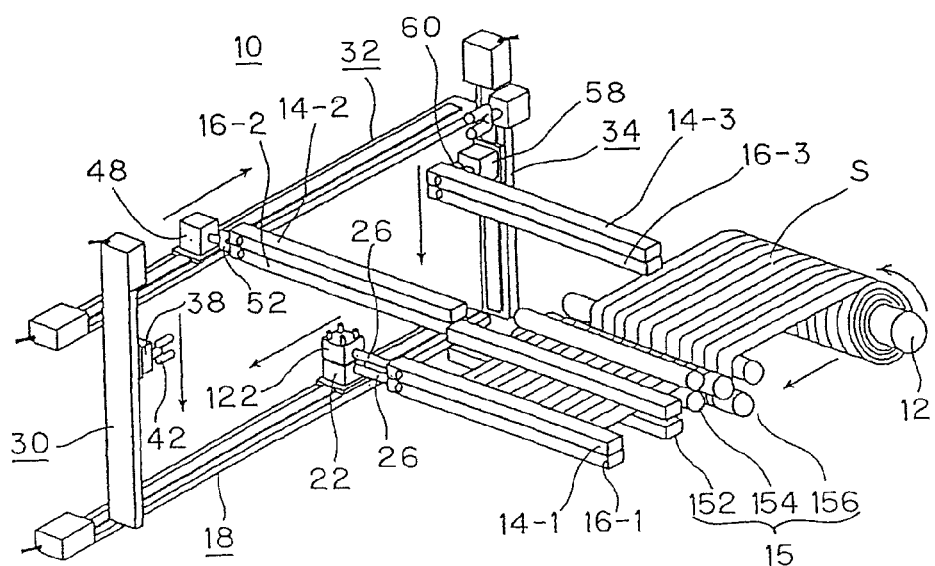
FIG. 18 is a perspective view of a sheet manufacturing apparatus according to the fourth embodiment of the invention.

In this embodiment, a pair of upper loop rail 86 and lower loop rail 88 is disposed as shown in FIG. 16. A plurality of upper mobile units 90 are movably disposed on the upper loop rail 86. A plurality of lower mobile units 92 are movably disposed on the lower loop rail 88. The upper clamping device 14 is moved by the upper mobile units 90, and the lower clamping device 16 is moved by the lower mobile units 92.

Also in this embodiment, the upper mobile units 90 and the lower mobile units 92 can be moved one after another. Therefore, the sheet S can be tentered without taking waiting time. Moreover, since an end of the sheet S is clamped by the pair of upper and lower clamping devices 14 and 16, the end of the sheet S can be fixed securely.

Fourth Embodiment

Referring now to FIGS. 17 to 23, a sheet manufacturing apparatus 10 according to a fourth embodiment will be described.

The sheet manufacturing apparatus 10 of this embodiment is different from the first embodiment in that the upper and lower clamping devices 14 and 16 are not separated and are returned in a unit from the end position to the initial position only by an upper locomotive robot. Specifically, the upper locomotive robot of this embodiment is an integral unit of the upper locomotive robot and the lower locomotive robot of the first embodiment, and a unit 150 for adjusting the end position of the sheet S at the initial position is provided to return the upper and lower clamping devices 14 and 16 in a unit to the initial position.

(1) Structure of Sheet Manufacturing Apparatus 10

The structure of the sheet manufacturing apparatus 10 according to the fourth embodiment will be described.

(1-1) Modifications from Sheet Manufacturing Apparatus 10 of First Embodiment To clamp an end of the sheet S at the initial position or to cancel the clamp of the sheet S at the end position, a clamping device open/close unit 122 is disposed on the tenter mobile unit 22 of the tenter robot 18 for inserting a sheet. Unlike the first embodiment, the tenter mobile unit 22 has a rod-like fixing pin 26 projecting therefrom. The clamping device open/close unit 122 also has a rod-like fixing pin 26 projecting therefrom. At the initial position, the fixing pin 26 of the clamping device open/close unit 122 is inserted into the insertion hole 45 of the upper clamping device 14, and the fixing pin 26 of the tenter mobile unit 22 is inserted into the insertion hole 45 of the lower clamping device 16. At the initial position, the clamping device open/close unit 122 is pushed downward to close the upper and lower clamping devices 14 and 16, thereby clamping the end of the sheet S, and at the end position, the clamping device open/close unit 122 opens upward to open the upper and lower clamping devices 14 and 16, thereby canceling the clamp of the end of the sheet S.

The reciprocating motion of the fixing pin 26 of the clamping device open/close unit 122 is controlled by an open/close-unit-fixing-pin controller 128.

To return the pair of upper and lower clamping devices 14 and 16 at the end position to the initial position by the first to third upper locomotive robots 30 to 34, the first upper mobile unit 38 of the first upper locomotive robot 30 has a first upper fixing pin 42, the second upper mobile unit 48 of the second upper locomotive robot 32 has a second upper fixing pin 52, and the third upper mobile unit 58 of the third upper locomotive robot 34 has a third upper fixing pin 60. The first to third fixing pins 42, 52, and 60 are of U shape different from the first embodiment.

(1-2) Structure of Sheet-End-Position Adjuster 150

After the pair of upper and lower clamping devices 14 and 16 is returned from the end position to the initial position by the upper locomotive robots 30 to 34, the end of the sheet S cut by the cutting device 80 has to be clamped again. For that purpose, a sheet-end-position adjuster 150 is disposed between the initial position and the winder 12 so that the end of the sheet S is retracted at the instant at which the pair of upper and lower clamping devices 14 and 16 returns to the initial position so that no sheet S is present at the initial position, and directly after the pair of upper and lower clamping devices 14 and 16 returns to the initial position to open the upper and lower clamping devices 14 and 16, the end of the sheet S is inserted therebetween, thereby allowing the upper and lower clamping devices 14 and 16 to clamp the end of the sheet S at the initial position.

The sheet-end-position adjuster 150 includes a temporary sheet clamping device 152 for temporarily clamping the sheet S, a rotation control roller 154 for inserting and retracting the sheet S, and a sheet accumulator 156 for applying a constant tension when the sheet S is inserted or retracted.

The temporary sheet clamping device 152 includes an upper temporary sheet clamping device 152-1 and a lower temporary sheet clamping device 152-2, and temporarily clamps an end of the sheet S by opening the upper temporary sheet clamping device 152-1 upward or pushing it according to the need.

The rotation control roller 154 includes an upper rotation control roller 154-1 and a lower rotation control roller 154-2. When transmitting the driving of the rotary roller to the sheet S, the upper rotation control roller 154-1 moves downward to clamp the sheet S and then the upper rotation control roller 154-1 or the lower rotation control roller 154-2 rotates (by a drive mechanism such as motor, not shown) to transmit the driving to the sheet S. When not transmitting the driving of the rotary roller, the upper and lower rotation control rollers 154-1 and 154-2 are not rotated but brought into free rotation mode or the upper rotation control roller 154-1 is opened upward so as not to clamp the sheet S.

The sheet accumulator 156 includes sheet support rollers 156-1 and 156-3 and a dancing roller 156-2 disposed between the sheet support rollers 156-1 and 156-3, and can apply a constant tension to the sheet S by the weight of the dancing roller 156-2 or the like. When an end of the sheet S is instantly inserted or retracted at the initial position, the dancing roller 156-2 moves vertically in accordance with the instant insertion or retraction of the sheet S, thereby applying a constant tension to the sheet S without looseness.

(2) Manufacturing Process of Sheet Manufacturing Apparatus 10 According to Fourth Embodiment The process of manufacture according to the fourth embodiment will be described on the basis of the process of manufacture according to the first embodiment.

In the eight manufacturing processes (4-1) to (4-8) according to the first embodiment, the process of clamping the sheet S at the initial position in the first process, the process after the sheet S is inserted in the third process, the process after the sheet S is cut on the side of the initial position in the sixth process, the process of tentering the sheet S on the pin tenters 102 in the seventh process, and the process of returning to the initial position in the eight process have difference from the first embodiment. Thus, these processes will be described. Since the other processes (the second, fourth, and fifth processes) are the same as those of the first embodiment, descriptions thereof will be omitted herein.

(2-1) First Process of Fourth Embodiment

Figure 19:
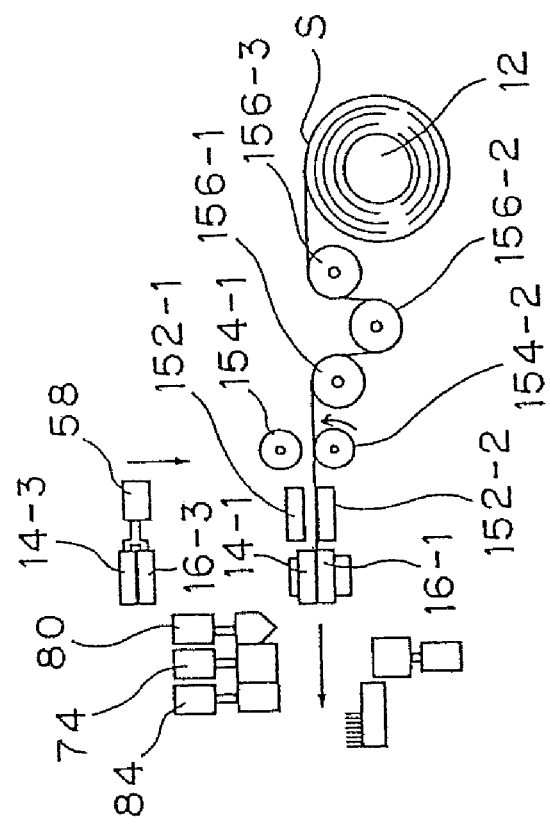
FIG. 19 is a diagram of describing a first process of the fourth embodiment.
Figure 19:
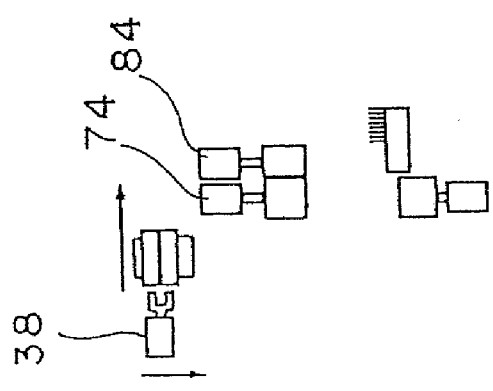

Referring to FIG. 19, the first process of the fourth embodiment will be described.

In the first process, an end of the sheet S that is partly drawn out from the winder 12 is clamped by the first set of upper and lower clamping devices 14-1 and 16-1 and fixed on the right of the pin tenters 102. The upper and lower clamping devices 14-1 and 16-1 are fixed together by the fixing pin 26 of the tenter mobile unit 22 of the tenter robot 18 and the fixing pin 26 of the clamping device open/close unit 122, and the tenter mobile unit 22 pushes them to clamp the sheet S.

The sheet-end-position adjuster 150 is in a state in which the upper temporary sheet clamping device 152-1 and the upper rotation control roller 154-1 are elevated to release the sheet S. The upper temporary sheet clamping device 152-1 and the upper rotation control roller 154-1 are elevated also while the sheet S is being inserted, and a constant tension by the brake of the winder 12 and the weight of the dancing roller 156-2 of the sheet accumulator 156 is applied to the sheet S.

The second set of upper and lower clamping devices 14-2 and 16-2 are located in pairs at the starting point of the second upper locomotive robot 32.

The third set of upper and lower clamping devices 14-3 and 16-3 are located in pairs at the end position of the second upper locomotive robot 32.

(2-2) Third Process of Fourth Embodiment

Figure 20:
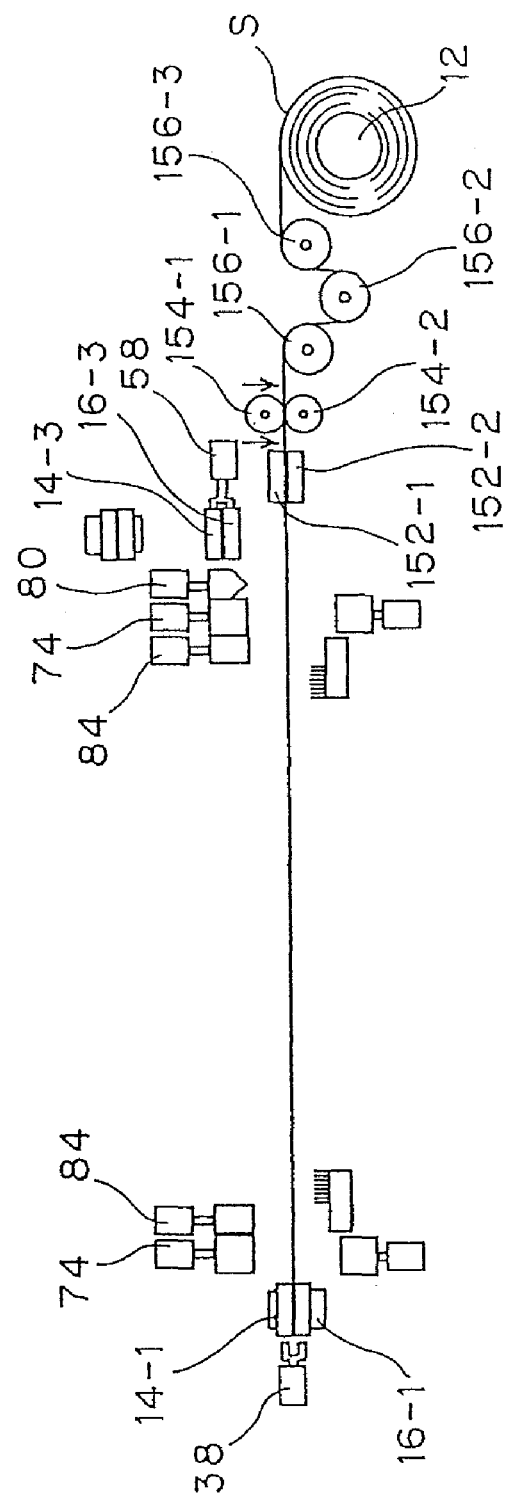
FIG. 20 is a diagram of describing a third process of the fourth embodiment.

Referring to FIG. 20, the third process of the fourth embodiment will be described.

In the third process, the first set of upper and lower clamping devices 14-1 and 16-1 moves along the width of the pin tenters 102 to reach the end position.

The second set of upper and lower clamping devices 14-2 and 16-2 reaches the end position by the second upper mobile unit 48 of the second upper locomotive robot 32.

The third set of upper and lower clamping devices 14-3 and 16-3 reaches from the starting point to the end position by the third upper mobile unit 58 of the third upper locomotive robot 34. The reached position is different from that of the first embodiment, which is above the initial position and out of contact with the sheet S inserted.

The sheet-end-position adjuster 150 is in a state in which the upper temporary sheet clamping device 152-1 and the upper rotation control roller 154-1 move downward to clamp the right side of the sheet S.

(2-3) Sixth Process of Fourth Embodiment

Figure 21:
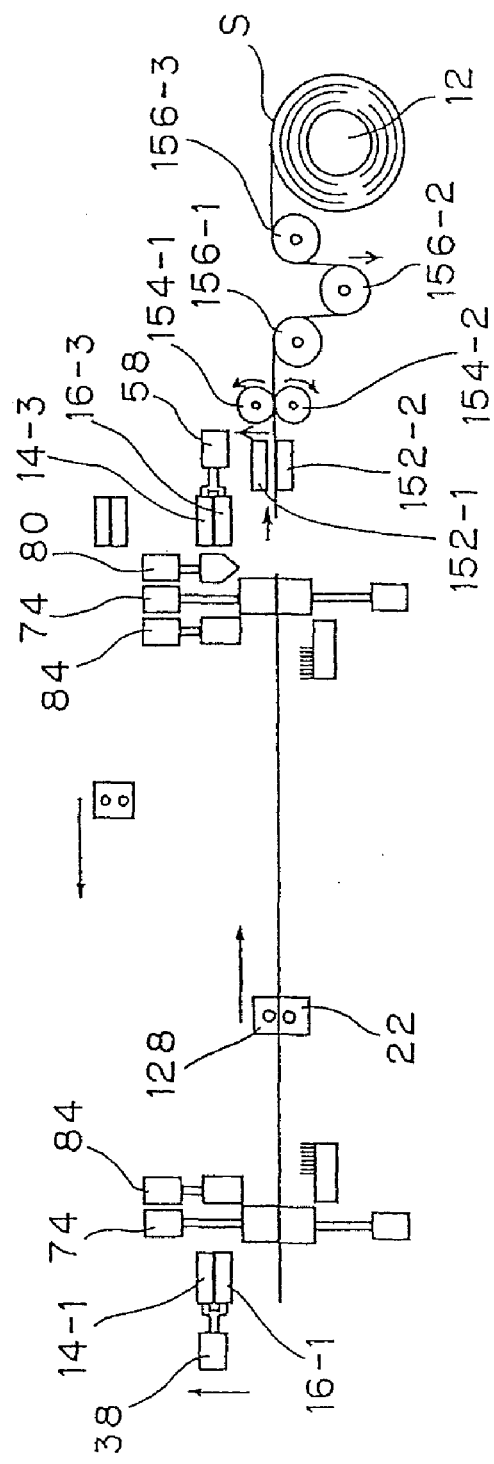
FIG. 21 is a diagram of describing a sixth process of the fourth embodiment.

Referring to FIG. 21, the sixth process of the fourth embodiment will be described.

In the sixth process, the first set of the upper and lower clamping devices 14-1 and 16-1 at the end position cancels the clamp of the sheet S in such a manner that the clamping device open/close unit 122 opens upward and is fixed by the U-shaped first upper fixing pin 42 of the first upper mobile unit 38 and then the first upper mobile unit 38 moves upward. Thereafter, the tenter mobile unit 22 and the clamping device open/close unit 122 at the end position return to the initial position along the tenter rail 20 at high speed.

The second upper mobile unit 48 of the second upper locomotive robot 32 also starts to move to the starting point. The second set of upper and lower clamping devices 14-2 and 16-2 are left in pairs at the end position. Thus, a (U-shaped) temporary fixing pin (not shown) in the vicinity of the right end of the second upper rail 46 is inserted into the insertion holes of the upper and lower clamping devices 14-2 and 16-2 to temporarily fix them.

The sheet-end-position adjuster 150 is in a state in which the upper temporary sheet clamping device 152-1 is elevated and the upper rotation control roller 154-1 is lowered. The rotation control roller 154 is rotated to drive the end of the sheet S so as to retract from the right or the initial position. At that time, the dancing roller 156-2 comes down to absorb the length of the retracted sheet S, thereby preventing the looseness of the sheet S. After the end of the sheet S is retracted from the initial position, the rotation of the rotation control roller 154 is stopped.

(2-4) Seventh Process of Fourth Embodiment

Figure 22:
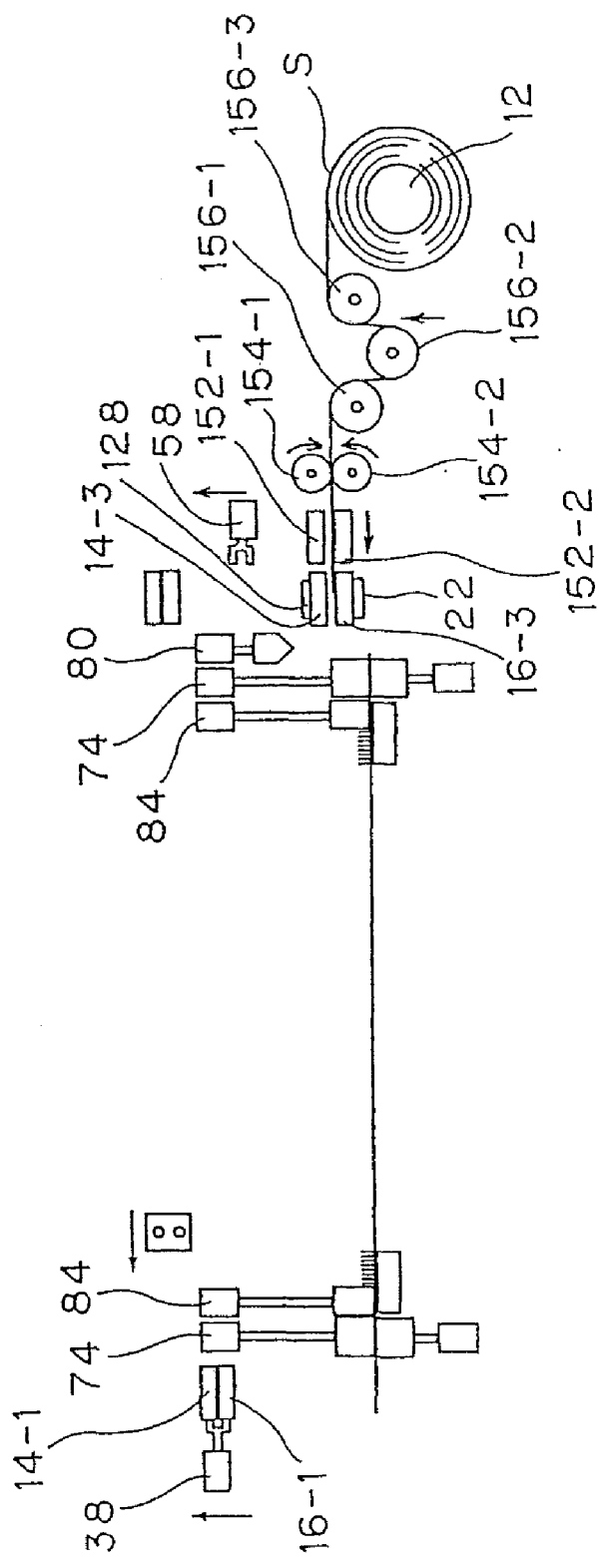
FIG. 22 is a diagram of describing a seventh process of the fourth embodiment.

Referring to FIG. 22, the seventh process of the fourth embodiment will be described.

In the seventh process, the sheet S that is temporarily held by the pair of right and left holders 74 is pushed downward together with the pair of right and left pressing units 84 to fix the rims to the spikes 106 on the right and left of the pin tenters 102. This is the process of tentering the sheet S to the pin tenters 102, which is the same as the first embodiment.

During this process, the pair of upper and lower clamping devices 14-3 and 16-3 is returned to the initial position by the third upper mobile unit 58 of the third upper locomotive robot 34. The upper and lower clamping devices 14-3 and 16-3 are fixed together by the fixing pin 26 of the tenter mobile unit 22 and the fixing pin 26 of the clamping device open/close unit 122 which are returned to the initial position, and the clamping device open/close unit 122 is opened upward so that the upper and lower clamping devices 14-3 and 16-3 are released.

At the instant at which the upper and lower clamping devices 14-3 and 16-3 are fixed by the fixing pins 26 of the tenter mobile unit 22 and the clamping device open/close unit 122, the third upper mobile unit 58 returns to the initial position along the third upper rail 56 at high speed.

Then the rotation control roller 154 is rotated so as to insert the end of the sheet S between the upper and lower clamping devices 14-3 and 16-3 on the left or at the initial position. At that time, the dancing roller 156-2 moves upward to thereby prevent the looseness of the sheet S. After the end of the sheet S is inserted between the upper and lower clamping devices 14-1 and 16-1, the rotation of the rotation control roller 154 is stopped.

(2-5) Eighth Process of Fourth Embodiment

Figure 23:
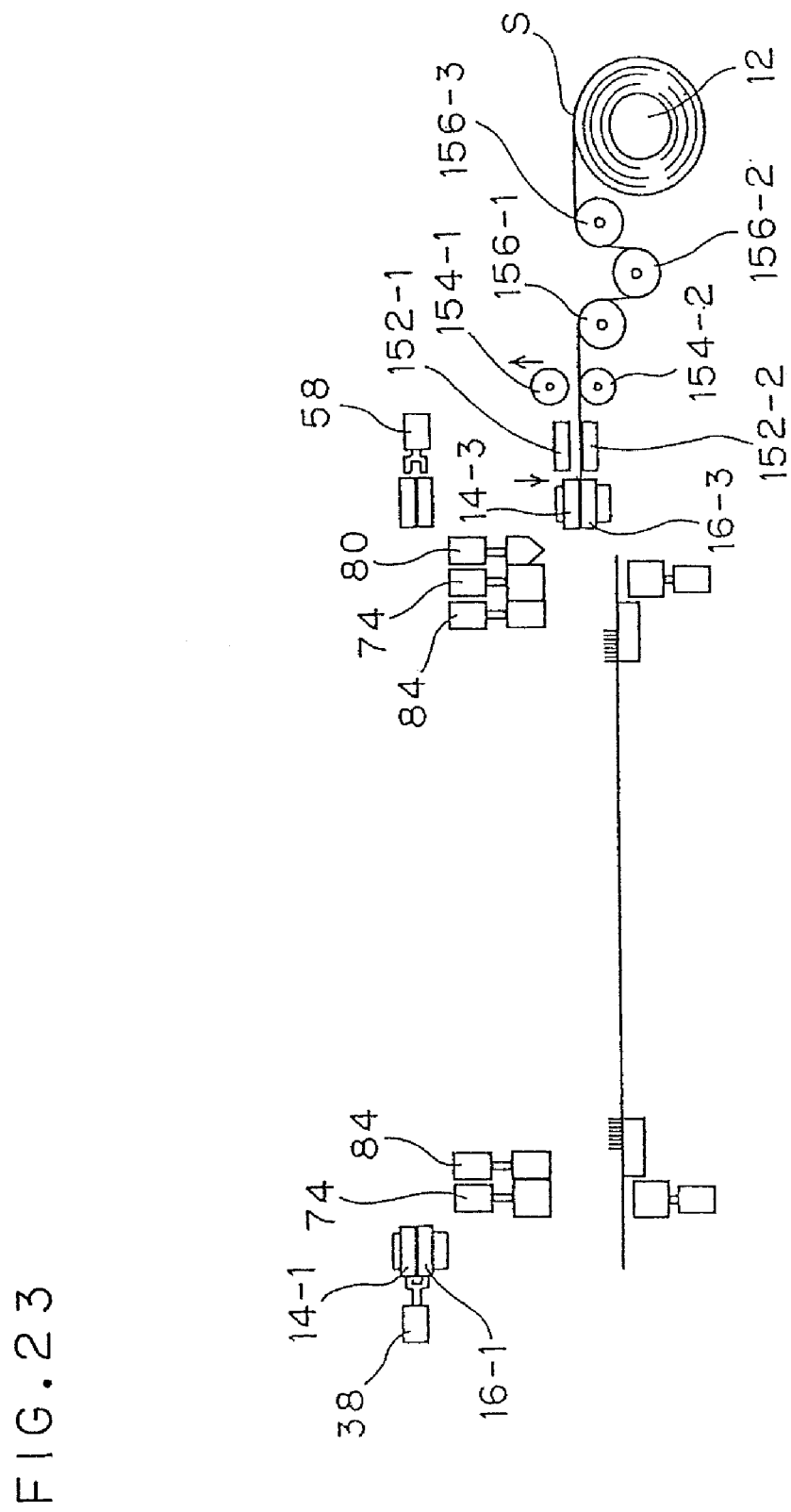
FIG. 23 is a diagram of describing an eighth process of the fourth embodiment.

Referring to FIG. 23, the fourth process of the fourth embodiment will be described.

In the eighth process, the pressing units 84 return upward, and the pair of right and left holders 74 also returns to the initial position so that the sheet S fixed to the pin tenters 102 travels at the traveling speed V.

The clamping device open/close unit 122 moves downward during the returning of the pressing units 84 and the holders 74 to push the upper clamping device 14-3 against the lower clamping device 16-3, thereby clamping the end of the sheet S. The upper rotation control roller 154-1 is moved upward to cancel the clamp of the sheet S. This allows the third set of upper and lower clamping devices 14-3 and 16-3 to draw out the sheet S, and the apparatus enters the first process of the next cycle.

(3) Modification

In this embodiment, the pair of upper and lower clamping devices 14 and 16 is returned from the end position to the initial position by the upper locomotive robots; alternatively, the upper and lower clamping devices 14 and 16 may be returned only with the lower locomotive robots.

(4) Advantages

According to this embodiment, the upper and lower clamping devices 14 and 16 are returned from the end position to the initial position in pairs without being separated only by the upper locomotive robot, thus simplifying the structure of the apparatus.

Fifth Embodiment

Figure 24:
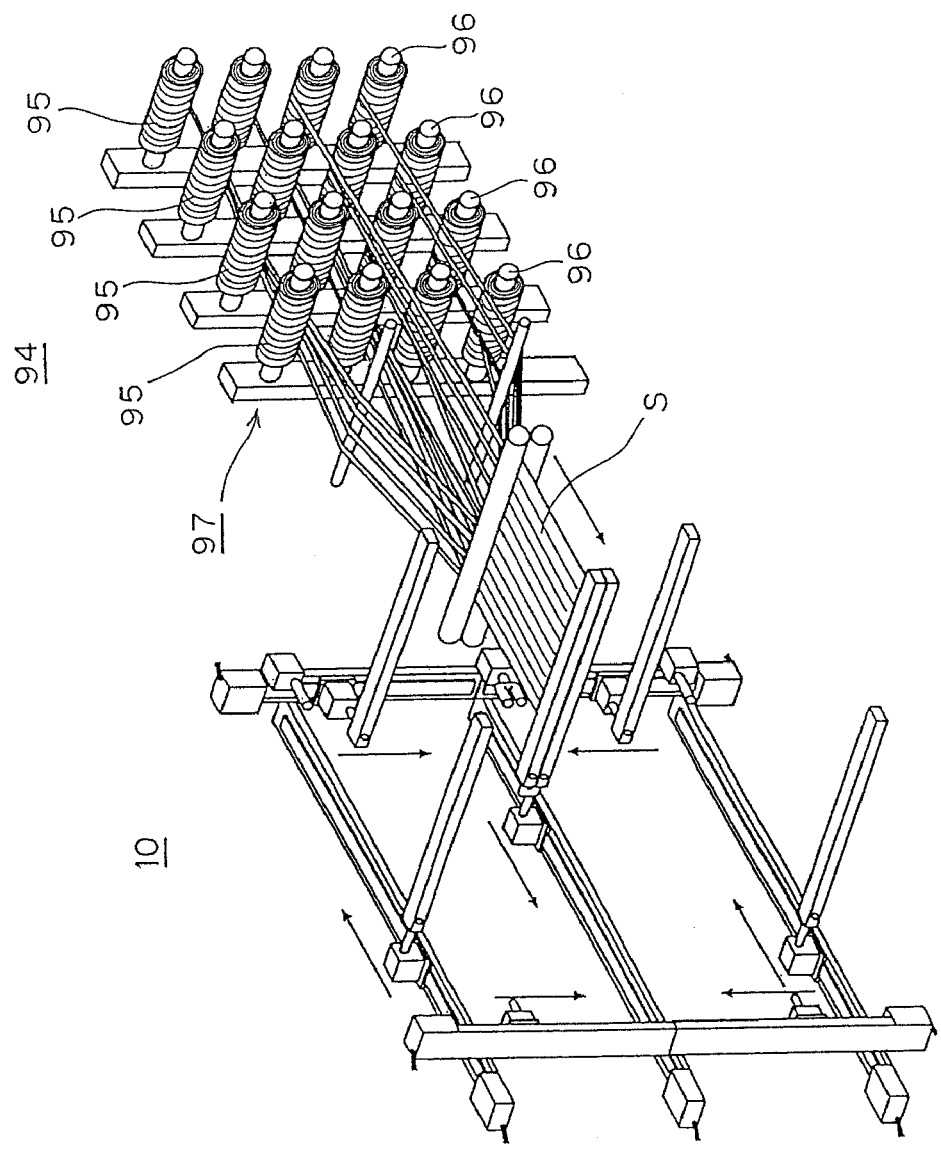
FIG. 24 is a perspective view of a sheet manufacturing apparatus according to a fifth embodiment of the invention.

Referring to FIG. 24, a sheet manufacturing apparatus 10 according to a fifth embodiment will be described.

In this embodiment, a fiber bundle feeder 94 is used in place of the winder 12 of the above embodiments.

The fiber bundle feeder 94 has a plurality of bobbins 96 around which fiber bundles 95 are wound. The plurality of fiber bundles 95 arranged along the width is drawn out as the sheet S from the fiber bundle feeder 94.

The fiber bundles drawn out from the fiber bundle feeder 94 may be opened into an opened fiber sheet S.

Modification

It is to be understood that the invention is not limited to the foregoing embodiments and may be modified variously without departing from the spirit and scope of the invention.

In the foregoing embodiments, the sheet S is tentered by three sheet manufacturing apparatuses 10 without stopping the pin tenters 102; instead, the pin tenters 102 may be temporarily stopped only during tentering.

In the foregoing embodiments, the multiaxis-multilayer-reinforced-sheet manufacturing apparatus 100 manufactures the multiaxis multilayer reinforced sheet T with the plurality of sheet manufacturing apparatus 10; alternatively, an apparatus that tenters a sheet (e.g., textile) at a predetermined angle with respect to the pin tenters 102 moving in one direction can adopt the sheet manufacturing apparatus 10.

A clip tenter may be used in place of the pin tenters 102.

Sixth Embodiment

Referring to FIGS. 25 to 34, the structure and operation of a sheet manufacturing apparatus 10 according to a sixth embodiment will be described.

(1) Outline of Sheet Manufacturing Apparatus 10

The sheet manufacturing apparatus 10 cuts the sheet S and tenters it to the pin tenters 102 at an inclination of θ°. Let θ be the angle of the pin tenters 102 with respect to the traveling direction, L be the width of the pin tenters 102, and H be the width of the sheet S for the purpose of description.

Figure 25:
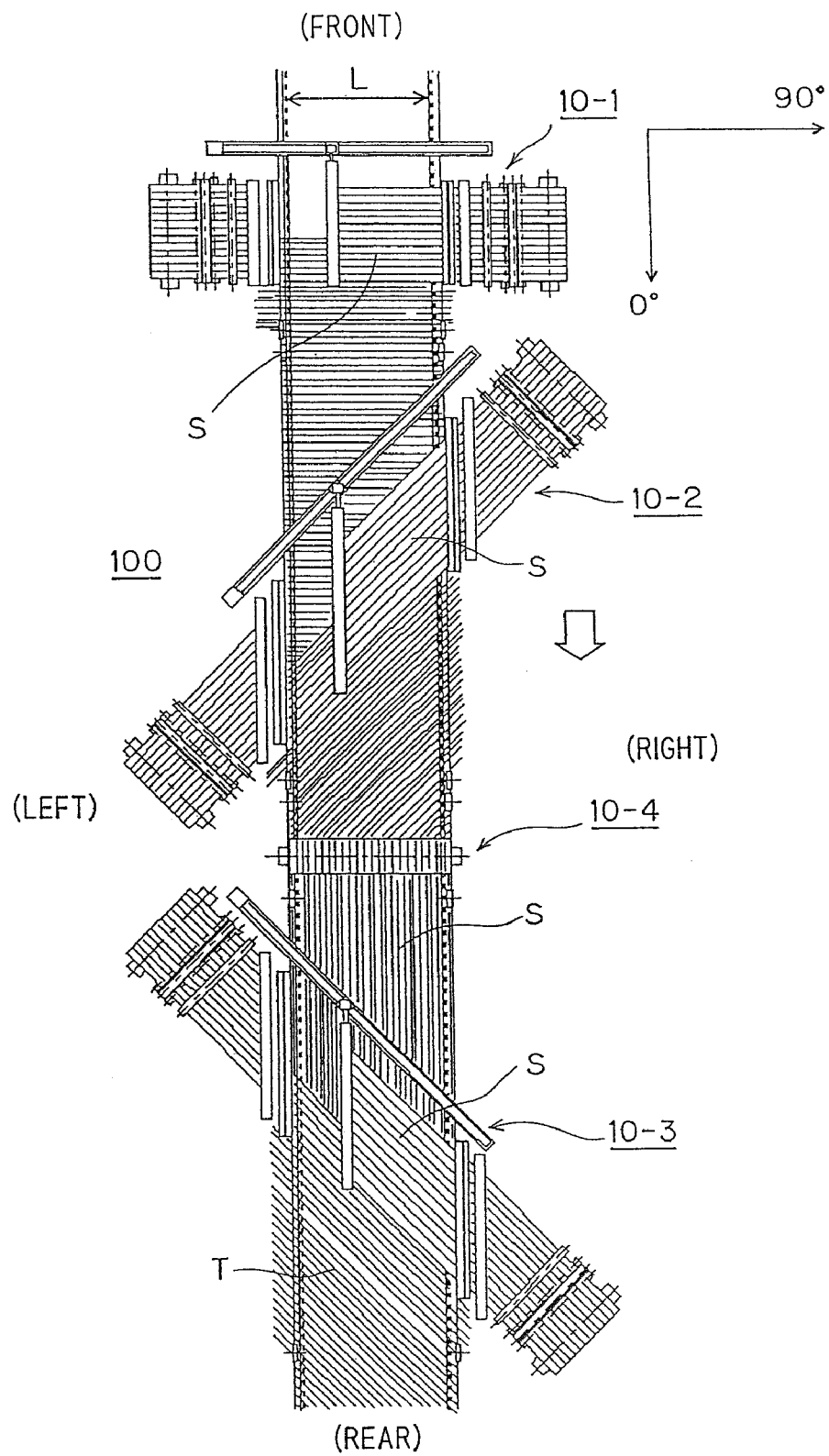
FIG. 25 is a plan view of a sheet manufacturing apparatus according to a sixth embodiment of the invention.

As shown in FIG. 25, the first sheet manufacturing apparatus 10-1 is disposed so that the sheet S is laminated at an angle of θ=90°; the second sheet manufacturing apparatus 10-2 is disposed so that the sheet S is laminated at an angle of θ=−45°; and the third sheet manufacturing apparatus 10-3 is disposed so that the sheet S is laminated at an angle of θ=45°. Since the first sheet manufacturing apparatus 10-1, the second sheet manufacturing apparatus 10-2, and the third sheet manufacturing apparatus 10-3 have the same structure, they will be described as the sheet manufacturing apparatus 10. The other structures are the same as those of the first embodiment.

(2) Structure of Sheet Manufacturing Apparatus 10

Figure 26:
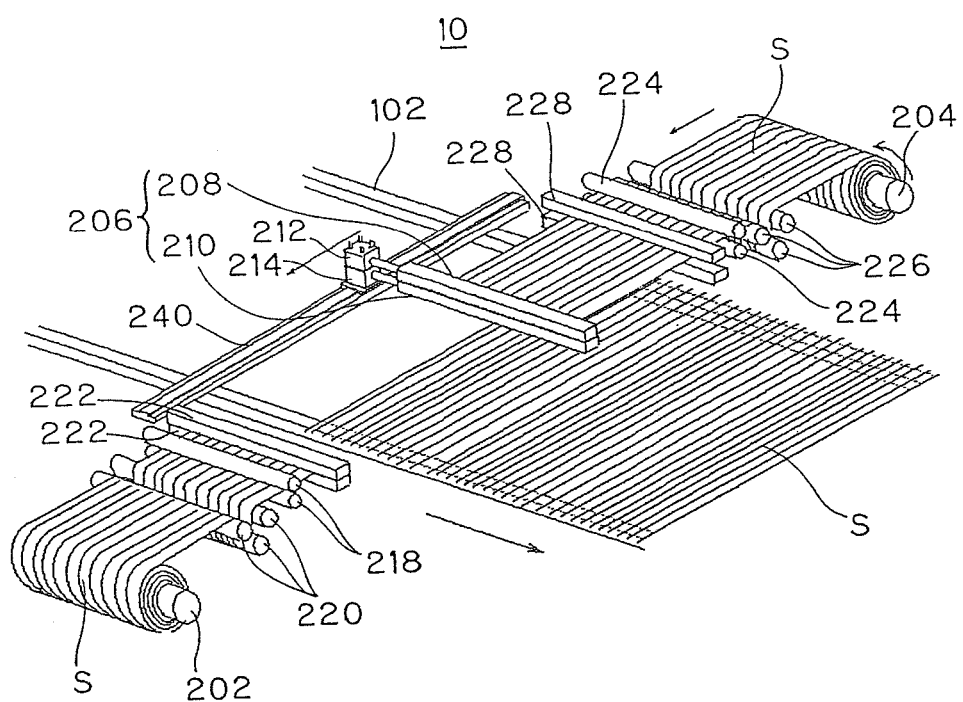
FIG. 26 is a perspective view of an apparatus for manufacturing a reinforced sheet, according to the sixth embodiment.

Referring to FIG. 26, the structure of the sheet manufacturing apparatus 10 according to the sixth embodiment will be described.

A left winder 202 and a right winder 204 for feeding the sheet S are disposed on the outside of both sides of the pin tenters 102. The left winder 202 is a roller in which the sheet S is wound around a roll, and feeds the sheet S by rotating the horizontal roll. The right winder 204 also has the same structure.

A clamping device 206 for clamping an end of the sheet S fed from the right winder 204 is provided. The clamping device 206 includes a horizontal rectangular upper clamping device 208 and lower clamping device 210. The end of the sheet S is clamped over the total width by the upper clamping device 208 and the lower clamping device 210. Specifically, the bases of the upper and lower clamping device 208 and 210 can be moved vertically. The end of the sheet S is clamped by the vertical motion of the bases of the upper and lower clamping devices 208 and 210. This structure is the same as that of the fourth embodiment shown in FIG. 17.

The upper and lower bases 212 and 214 of the upper and lower clamping devices 208 and 210 move together on a rail 216. The rail 216 is arranged horizontally so as to cross above the pin tenters 102. The angle that the rail 216 forms with the pin tenters 102 is the angle θ at which the sheet S is tentered. The rail 216 is formed from the left winder 202 to the right winder 204, along which the clamping device 206 is moved from the left winder 202 to the right winder 204.

A pair of upper and lower left drive rollers 218 for drawing out the sheet S is disposed at the position of the left winder 202 where the sheet S is to be drawn out. The pair of upper and lower left drive rollers 218 can each be moved vertically by a pneumatic cylinder. Three left guide rollers 220 are disposed between the left winder 202 and the left drive rollers 218. A pair of upper and lower left temporary fixing plates 222 for temporarily fixing an end of the sheet S drawn out from the pair of upper and lower left drive rollers 218 is provided. The left temporary fixing plates 222 are arranged horizontally so as to be moved vertically by respective pneumatic cylinders, and temporarily fix the sheet S by clamping them from above and below.

The right winder 204 also has a pair of upper and lower right drive rollers 224, three right guide rollers 226, and a pair of upper and lower right temporary fixing plates 228 as on the left side.

Figure 27:
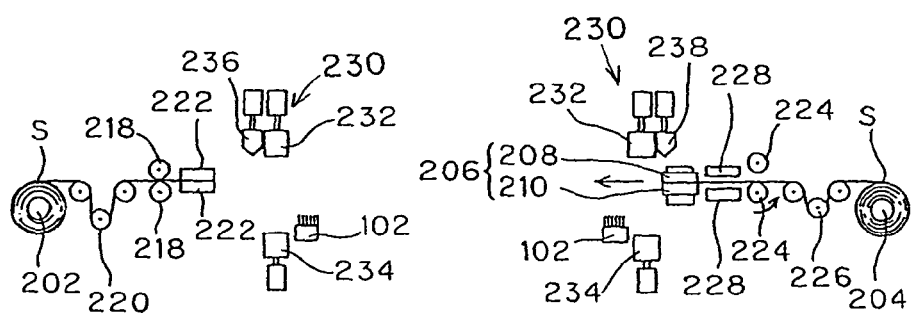
FIG. 27 is a diagram of describing a first process of the sixth embodiment.
Figure 34:
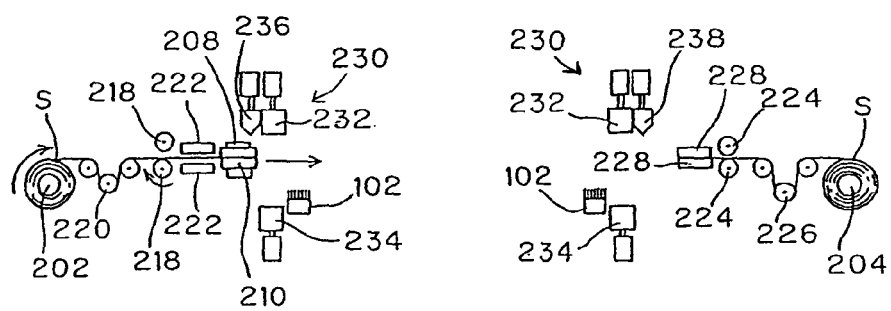
FIG. 34 is a diagram of describing an eighth process of the sixth embodiment.

Referring to FIGS. 27 and 34, a pair of right and left holders 230 for clamping the spread sheet S from above and below is disposed on the right and left of the pin tenters 102. The left holder 230 is composed of an upper holder plate 232 and a lower holder plate 234, each of which is moved vertically by a pneumatic cylinder to clamp the sheet S. The right holder 230 has the same structure.

A left cutter 236 is disposed on the left of the pin tenters 102 and between the outside of the left holder 230 and the left temporary fixing plates 222. A right cutter 238 is disposed on the right of the pin tenters 102 and between the outside of the right holder 230 and the right temporary fixing plates 228. The left and right cutters 236 and 238 are each moved vertically by a pneumatic cylinder to cut the spread sheet S held by the pair of left and right holders 230.

(3) Manufacturing Process of Sheet Manufacturing Apparatus 10

The manufacturing process of the sheet manufacturing apparatus 10 according to the sixth embodiment will be described in sequence with reference to FIGS. 27 to 34.

(3-1) First Process

Referring to FIG. 27, the first process will be described.

In the first process, an end of the sheet S that is partly drawn out from the right winder 204 is clamped by the clamping device 206 composed of the pair of upper and lower clamping devices 208 and 210. Specifically, the sheet S is drawn out by the pair of upper and lower right drive rollers 224 and is clamped by the upper and lower clamping devices 208 and 210.

Another end of the sheet S that is partly drawn out from the left winder 202 is temporarily fixed by the pair of upper and lower left temporary fixing plates 222. The pair of upper and lower left drive rollers 218 are kept closed.

(3-2) Second Process

Figure 28:
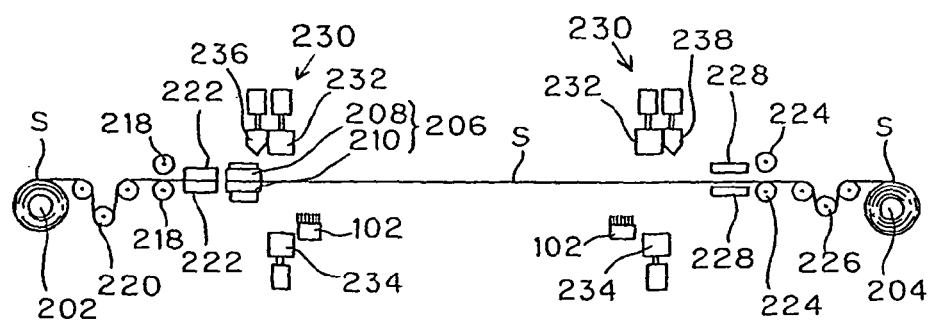
FIG. 28 is a diagram of describing a second process of the sixth embodiment.

Referring to FIG. 28, the second process will be described.

In the second process, the clamping device 206 is moved from the right to the left along the rail 216. Thus, the sheet S is spread over the pin tenters 102.

(3-3) Third Process

Figure 29:
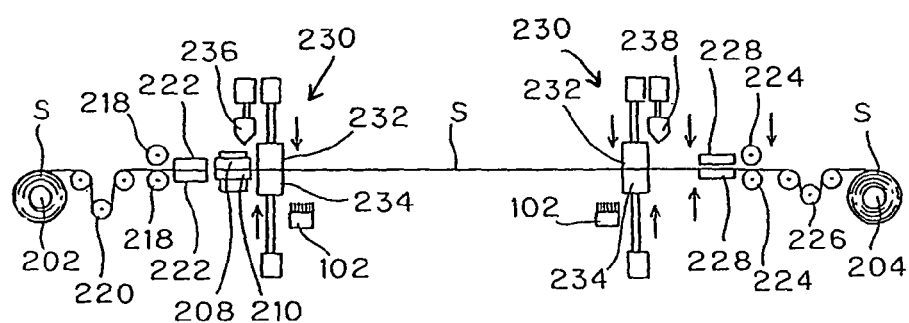
FIG. 29 is a diagram of describing a third process of the sixth embodiment.

Referring to FIG. 29, the third process will be described.

In the third process, since the sheet S from the right is spread over the pin tenters 102 by the clamping device 206 that has moved to the left end of the rail 216, both ends of the sheet S are held by the pair of right and left holders 230. Specifically, the right end and the left end of the sheet S are each held by the upper and lower holders 232 and 234.

The right side of the sheet S is temporarily fixed by the temporary fixing plates 228 in the third process.

(3-4) Fourth Process

Figure 30:
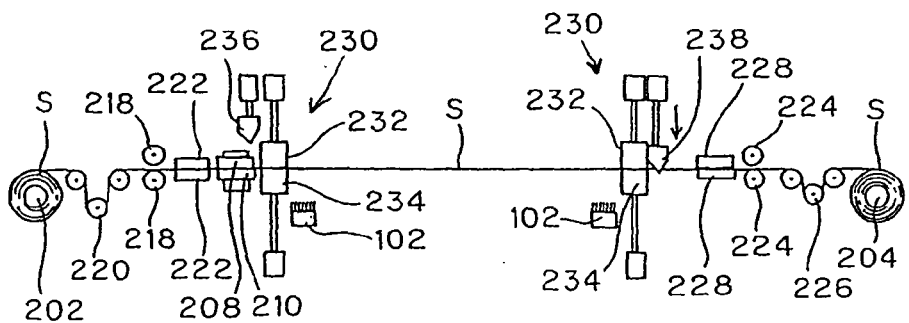
FIG. 30 is a diagram of describing a fourth process of the sixth embodiment.

Referring to FIG. 30, the fourth process will be described.

In the fourth process, the right end of the sheet S held in a spread state is cut by the right cutter 238. The cutting position is between the right holder 230 and the right temporary fixing plates 228.

(3-5) Fifth Process

Figure 31:
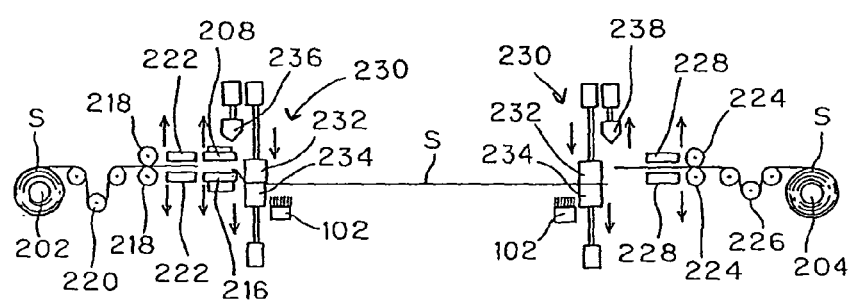
FIG. 31 is a diagram of describing a fifth process of the sixth embodiment.

Referring to FIG. 31, the fifth process will be described.

The pair of right and left holders 230 is moved downward at the same time by pneumatic cylinders, with the pair of upper and lower clamping devices 208 and 210 open, to push the cut sheet S downward. The right cutter 238 is returned to the initial state, and the pair of upper and lower right temporary fixing plates 228 is moved above and below, respectively, to release the end of the right sheet S drawn out from the right winder 204.

The pair of upper and lower left temporary fixing plates 222 that are temporarily fixing the left end of the sheet S drawn from the left winder 202 is also opened. The upper and lower clamping devices 208 and 210 are also opened.

(3-6) Sixth Process

Figure 32:
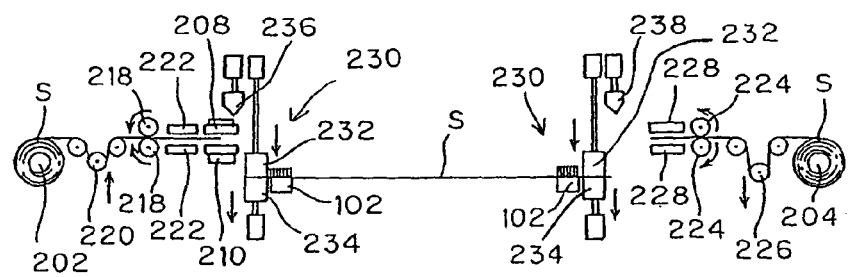
FIG. 32 is a diagram of describing a sixth process of the sixth embodiment.

Referring to FIG. 32, the sixth process will be described.

The pair of right and left holders 230 is further moved downward to push the drawn spread sheet S against the right and left pins of the pin tenters 102 to tenter it.

The pair of upper and lower left drive rollers 218 is rotated to move the end of the sheet S drawn out from the left winder 202 to the position of the upper and lower clamping devices 208 and 210 in an open state.

The right drive rollers 224 are rotated so as to locate the right end of the sheet S drawn out from the right winder 204 to the position of the pair of right temporary fixing plates 228.

(3-7) Seventh Process

Figure 33:
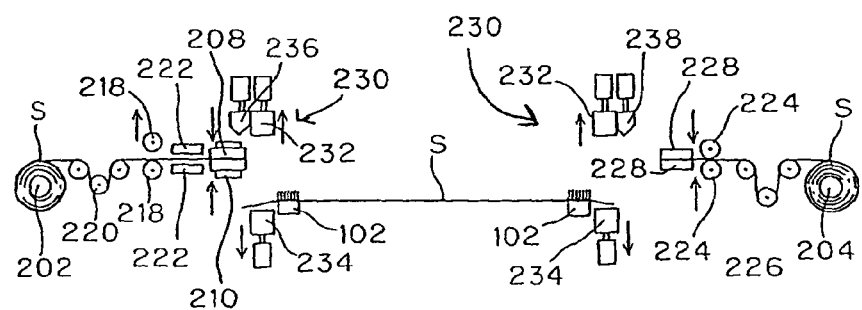
FIG. 33 is a diagram of describing a seventh process of the sixth embodiment.

Referring to FIG. 33, the seventh process will be described.

In the seventh process, the sheet S drawn out from the left winder 202 is clamped by the pair of upper clamping device 208 and lower clamping device 210 on the left. At that time, the pair of upper and lower left drive rollers 218 are opened. On the other hand, the sheet S from the right is temporarily clamped by the pair of upper and lower right temporary fixing plates 228. The pair of upper and lower holder plates 232 and 234 of the right and left holders 230 are moved upward and downward, respectively, to be opened.

Thus, the sheet S is tentered on the pin tenters 102 at a predetermined angle $\theta°$. The pin tenters 102 are moved a predetermined distance in that state. That is, the pin tenters 102 are moved by the width L thereof for the sheet S to be tentered next.

(3-8) Eighth Process

Referring to FIG. 34, the eighth process will be described.

In the eighth process, the clamping device 206 is moved from the left to the right, as in the first process, to spread the sheet S over the pin tenters 102.

The processes from then on are the same as those from the second process described above, which are merely diametrically opposed.

The first to seventh processes are repeated in sequence to tenter the sheet S over the pin tenters 102 at a predetermined angle $\theta°$.

(4) Advantage

The sheet manufacturing apparatus 10 of the eighth embodiment can tenter the sheet S only by moving the clamping device 206 from the left to the right and then from the left to the right, allowing the sheet S to be tentered efficiently.

(5) First Modification

Figure 35:
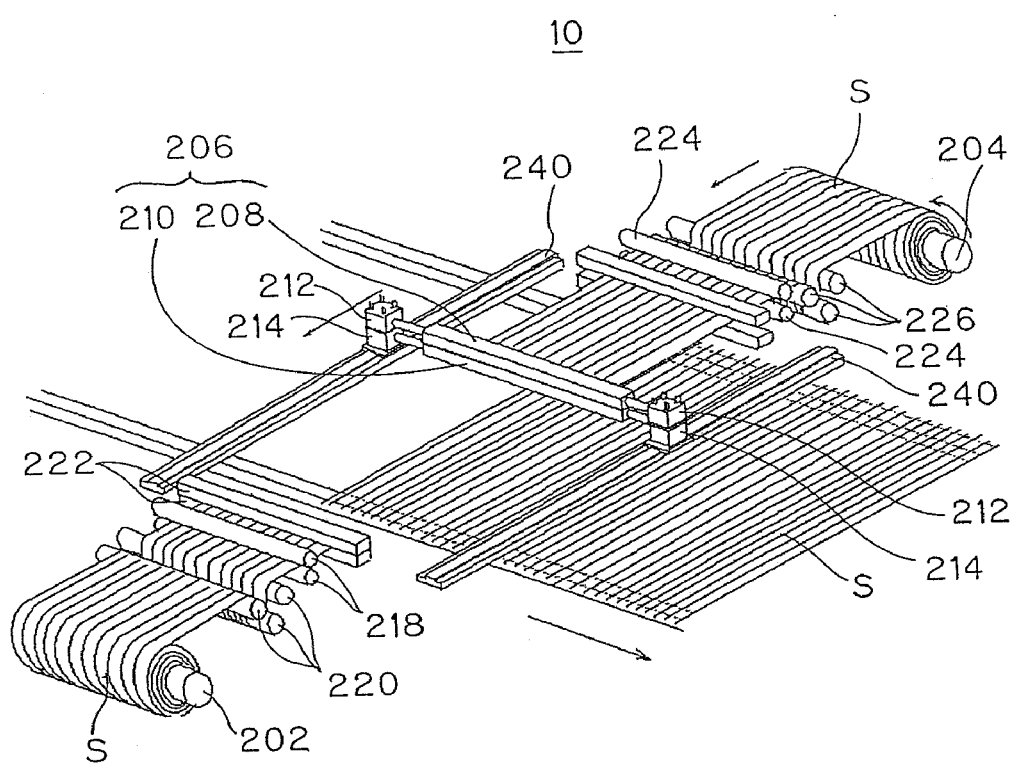
FIG. 35 is a perspective view of a first modification of the sixth embodiment.

In the sixth embodiment, the clamping device 206 is supported on one side and moved only along the rail 216 on one side. Alternatively, as shown in FIG. 35, a pair of rails 240 may be provided on both ends of the clamping device 206, along which the clamping device 206 may be moved.

With this modification, the clamping device 206 can be moved while being securely retained.

(6) Second Modification

Figure 36:
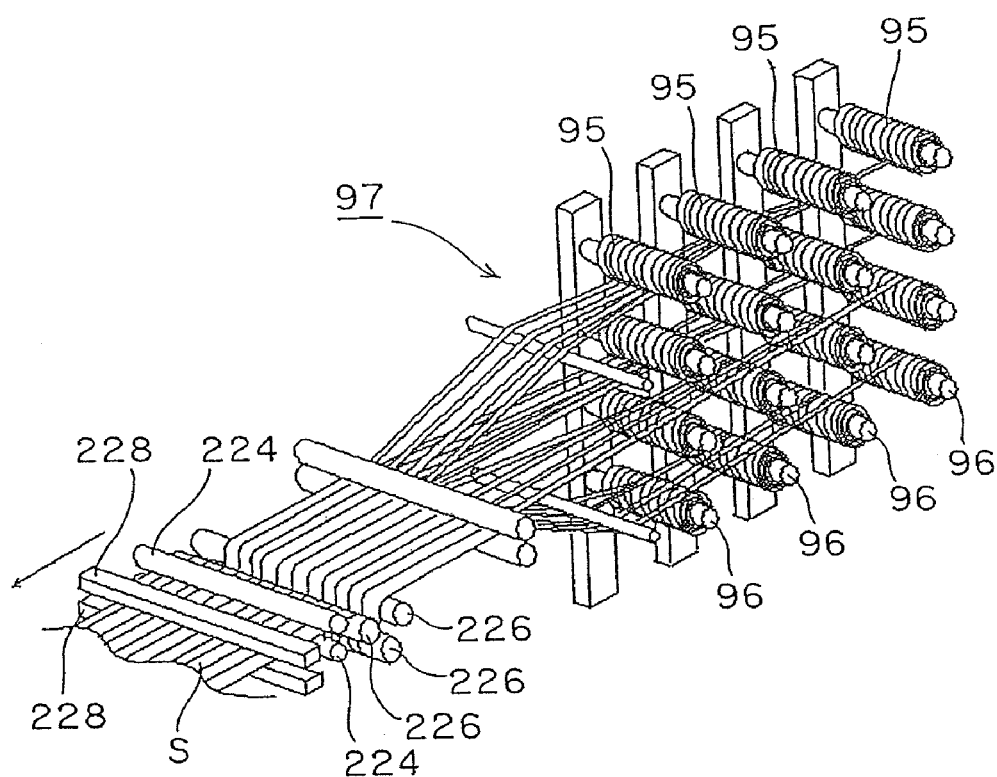
FIG. 36 is a perspective view of a second modification of the sixth embodiment.

Referring to FIG. 36, a second modification will be described.

With the second modification, in place of the right winder 204 of the sixth embodiment, the fiber bundle feeder 94 is used as in the fifth embodiment.

The fiber bundle feeder 94 includes a plurality of bobbins 96 around which the fiber bundles 95 are wound. The plurality of fiber bundles 95 arranged along the width and is drawn out as the sheet S from the fiber bundle feeder 94.

The fiber bundles drawn out from the fiber bundle feeder 94 may be opened into an opened fiber sheet S. The left winder 202 may also be replaced with the fiber bundle feeder 94.

What is claimed is:

1. A sheet manufacturing apparatus for manufacturing a reinforced sheet including a sheet-like material and a sheet by tentering the sheet at a predetermined angle over a transfer device that transfers the sheet-like material in a spread state with both rims fixed, the apparatus comprising:

a first sheet feeder and a second sheet feeder, provided as a pair of right and left feeders disposed on the right and left sides of the transfer device, respectively, each of which feeds sheet from first and second sheet sources;

a clamping device configured to clamp an end of a sheet fed from one of the first and second sheet sources at a preselected time and to release said end at a preselected time;

a tentering locomotive unit configured to move the clamping device from the first sheet feeder to the second sheet feeder and vice versa while carrying an end of a sheet from one of the first and second sheets sources that is clamped within the clamping device in order to provide the first sheet or second sheet in a spread state;

right and left holders configured to hold the right and left sides of the first sheet or second sheet in the spread state;

first and second cutting devices disposed on right and left sides of the transfer device configured to preselectively cut one of the right and left sides of the spread sheet when the sheet is held by the right and left holders;

right and left fixing devices configured to move the cut spread sheet held by the right and left holders downward to tenter the cut spread sheet by fixing both sides of the cut spread sheet to the right and left sides of the transfer device;

first and second sheet holding and preparing devices on the right and left sides of the transfer device for holding an end of a sheet from one of the first and second sheet sources that was not moved by the clamping device and for advancing said end towards the clamping device at a preselected time after downward movement of the cut spread sheet.

2. The sheet manufacturing apparatus according to claim 1, wherein
   the right and left holders are integrated to one; and
   the right fixing device and the left fixing device are integrated to one.

3. The sheet manufacturing apparatus according to claim 2, wherein the right and left holders, the first fixing device, and the second fixing device are integrated to one.

4. An apparatus for manufacturing a multiaxis multilayer reinforced sheet, the apparatus comprising:
   a plurality of the sheet manufacturing apparatus according to claim 3 disposed on the transfer device at predetermined intervals, wherein
   the sheet manufacturing apparatuses tenter a sheet on the transfer device at a predetermined angle to laminate the sheet on a sheet-like material in sequence.

5. An apparatus for manufacturing a multiaxis multilayer reinforced sheet, the apparatus comprising:
   a plurality of the sheet manufacturing apparatus according to claim 2 disposed on the transfer device at predetermined intervals, wherein
   the sheet manufacturing apparatuses tenter a sheet on the transfer device at a predetermined angle to laminate the sheet on a sheet-like material in sequence.

6. The sheet manufacturing apparatus according claim 1, wherein
   the tentering locomotive unit further comprises
   a rail on which the clamping device is movably mounted to move between the first sheet feeder and the second sheet feeder.

7. An apparatus for manufacturing a multiaxis multilayer reinforced sheet, the apparatus comprising:
   a plurality of the sheet manufacturing apparatus according to claim 1 disposed on the transfer device at predetermined intervals, wherein
   the sheet manufacturing apparatuses tenter a sheet on the transfer device at a predetermined angle to laminate the sheet on a sheet-like material in sequence.

\* \* \* \* \*